United States Patent
Imamura et al.

(10) Patent No.: US 10,315,507 B2
(45) Date of Patent: Jun. 11, 2019

(54) HYBRID VEHICLE

(71) Applicant: TOYOTA JIDOSHA KABUSHIKI KAISHA, Toyota-shi, Aichi-ken (JP)

(72) Inventors: Tatsuya Imamura, Okazaki (JP); Atsushi Tabata, Okazaki (JP); Toshiki Kanada, Anjo (JP); Hidehiko Banshoya, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 15/549,637

(22) PCT Filed: Feb. 16, 2016

(86) PCT No.: PCT/IB2016/000142
§ 371 (c)(1),
(2) Date: Aug. 8, 2017

(87) PCT Pub. No.: WO2016/132205
PCT Pub. Date: Aug. 25, 2016

(65) Prior Publication Data
US 2018/0222308 A1    Aug. 9, 2018

(30) Foreign Application Priority Data
Feb. 18, 2015   (JP) ................................. 2015-029436

(51) Int. Cl.
*B60K 6/445* (2007.10)
*B60K 6/365* (2007.10)
(Continued)

(52) U.S. Cl.
CPC .............. *B60K 6/445* (2013.01); *B60K 6/365* (2013.01); *B60K 6/387* (2013.01); *B60W 10/02* (2013.01); *B60W 10/06* (2013.01); *B60W 10/08* (2013.01); *B60W 20/00* (2013.01); *B60W 20/20* (2013.01); *B60W 20/40* (2013.01); *F16H 3/728* (2013.01); *F16H 2037/0873* (2013.01); *F16H 2200/2007* (2013.01); *F16H 2200/2038* (2013.01); *Y02T 10/6286* (2013.01)

(58) Field of Classification Search
CPC ........ B60K 6/365; B60K 6/387; B60K 6/445; B60W 10/02; B60W 10/06; B60W 10/08; B60W 20/20; B60W 20/40; F16H 3/728
See application file for complete search history.

(56) References Cited

U.S. PATENT DOCUMENTS 6,155,364 A  * 12/2000  Nagano ................. B60K 6/365
                                                         180/65.235
2006/0046886 A1* 3/2006  Holmes ................. B60K 6/365
                                                         475/5
(Continued)

FOREIGN PATENT DOCUMENTS

CN        104093617 A      10/2014
DE   10 2012 219 853 A1     5/2013
(Continued)

*Primary Examiner* — Huan Le
(74) *Attorney, Agent, or Firm* — Oliff PLC

(57) ABSTRACT

A hybrid vehicle includes a clutch and a transmission unit configured to be able to switch into a neutral state. The hybrid vehicle is able to transmit power of an engine through any one of a first path through which power is transmitted from the engine to a first MG via a transmission unit and a differential unit and another second path through which power is transmitted from the engine to the first MG. The clutch is provided in the second path, and switches between an engaged state and a released state. The controller controls the engine, the first MG, the transmission unit and the clutch. The controller sets the transmission unit to a non-neutral state, sets the clutch to the engaged state, and then causes the vehicle to travel by using driving force from the first MG and driving force from the second MG.

9 Claims, 17 Drawing Sheets

(51) Int. Cl.
  *B60K 6/387*  (2007.10)
  *B60W 10/02*  (2006.01)
  *B60W 10/06*  (2006.01)
  *B60W 10/08*  (2006.01)
  *B60W 20/00*  (2016.01)
  *F16H 3/72*  (2006.01)
  *B60W 20/40*  (2016.01)
  *B60W 20/20*  (2016.01)
  *F16H 37/08*  (2006.01)

(56)     References Cited

U.S. PATENT DOCUMENTS

| | | | |
|---|---|---|---|
| 2007/0149334 A1* | 6/2007 | Holmes | B60K 6/365 |
| | | | 475/5 |
| 2013/0116866 A1 | 5/2013 | Perkins et al. | |
| 2013/0253743 A1* | 9/2013 | Maruyama | B60K 6/445 |
| | | | 701/22 |
| 2015/0021110 A1 | 1/2015 | Ono et al. | |
| 2016/0101681 A1 | 4/2016 | Okuwaki et al. | |

FOREIGN PATENT DOCUMENTS

| | | |
|---|---|---|
| EP | 1 728 666 A1 | 12/2006 |
| EP | 2 810 806 A1 | 12/2014 |
| EP | 2 810 839 A1 | 12/2014 |
| JP | 2012-071699 A | 4/2012 |
| JP | 2015-024793 A | 2/2015 |
| JP | 2016-150673 A | 8/2016 |
| WO | 2013/114594 A1 | 8/2013 |
| WO | 2014/184852 A1 | 11/2014 |
| WO | 2016/132207 A1 | 8/2016 |

\* cited by examiner

FIG. 5

| | | TRAVELING-STATE | | C1 | B1 | CS | MG1 | MG2 |
|---|---|---|---|---|---|---|---|---|
| E1 | EV MODE | FORWARD/REVERSE | ONE-MOTOR | × | × | × | – | M |
| E2 | | | DURING DRIVING | △ | △ | × | M | G |
| E3 | | | DURING ENGINE BRAKE | ○ | ○ | × | M | M |
| E4 | | | TWO-MOTOR Ne=0 | × | ○ | ○ | M | M |
| E5 | | | Ne FREE | ○ | × | ○ | M | M |
| H1 | HV MODE | SERIES-PARALLEL MODE | FORWARD | STEPLESS HIGH GEAR | × | ○ | × | M | M |
| H2 | | | | STEPLESS LOW GEAR | ○ | × | × | G | M |
| H6 | | PARALLEL MODE | | STEPPED HIGH GEAR ONE-MOTOR | × | ○ | ○ | G | M |
| H7 | | | | STEPPED HIGH GEAR TWO-MOTOR | × | ○ | ○ | – | M |
| H8 | | | | STEPPED LOW GEAR ONE-MOTOR | ○ | × | ○ | – | M |
| H9 | | | | STEPPED LOW GEAR TWO-MOTOR | ○ | × | ○ | M | M |
| H3 | | SERIES-PARALLEL MODE | REVERSE | LOW GEAR | ○ | × | × | M | M |
| H4 | | SERIES MODE | FORWARD | | × | × | ○ | G | M |
| H5 | | | REVERSE | | × | × | ○ | G | M |
| Z1 | ENGINE DRIVE MODE | FORWARD STEPPED | HIGH GEAR | × | ○ | ○ | G | – |
| Z2 | | | LOW GEAR | ○ | × | ○ | – | – |

○: ENGAGED    △: ANY ONE IS ENGAGED WHILE USING ENGINE BRAKE IN COMBINATION    ×: RELEASED
G: MAINLY GENERATOR    M: MAINLY MOTOR; HOWEVER, GENERATOR DURING REGENERATION

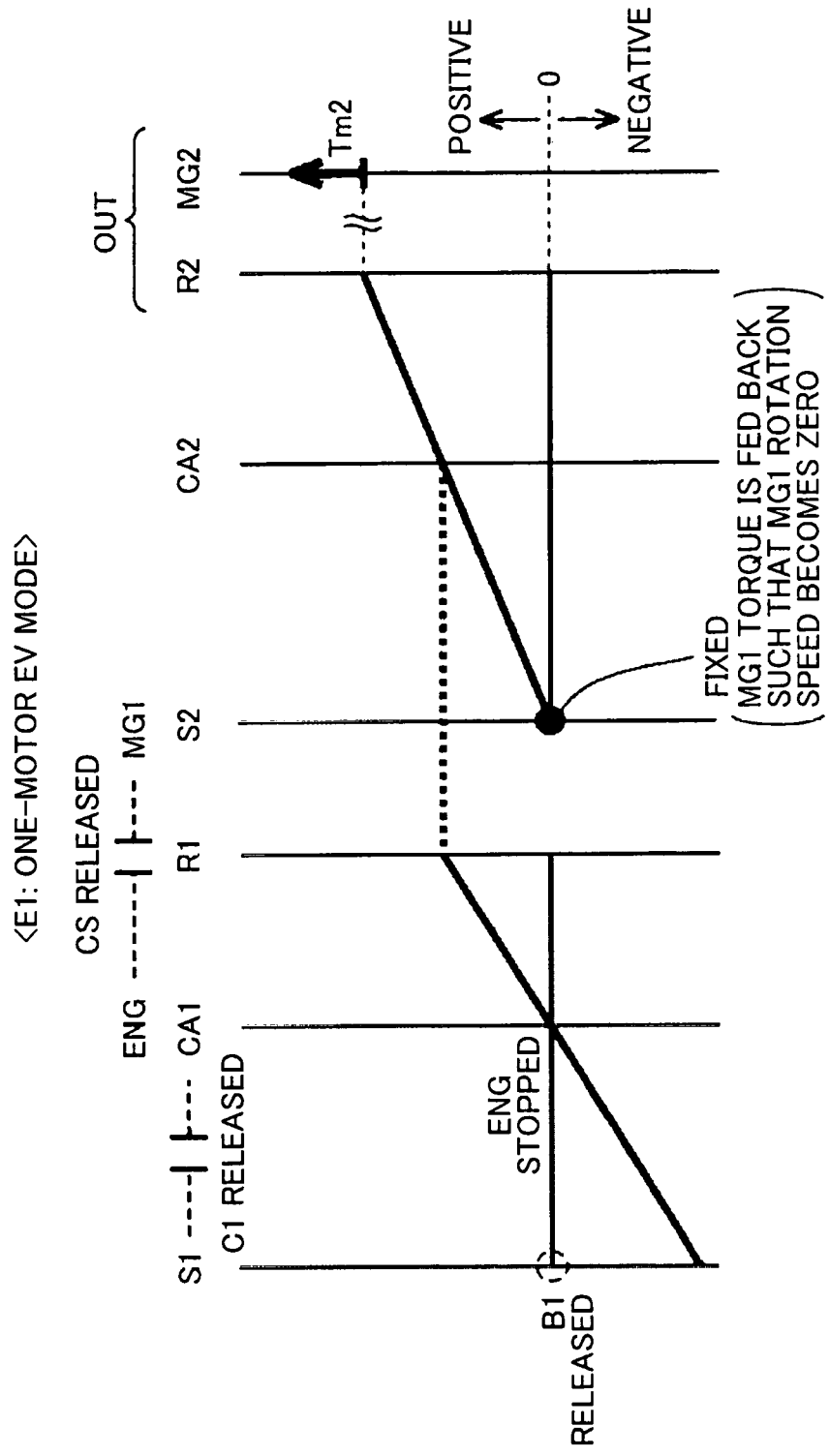

HYBRID VEHICLE

BACKGROUND OF THE INVENTION

1. Field of the Invention

The invention relates to a hybrid vehicle and, more particularly, to a hybrid vehicle including first and second rotary electric machines and a transmission unit.

2. Description of Related Art

There is known a hybrid vehicle including not only an engine, two rotary electric machines and a power split mechanism but also a transmission mechanism between the engine and the power split mechanism.

A hybrid vehicle described in International Application Publication No. 2013/114594 employs a series-parallel hybrid system. In the vehicle having a series-parallel hybrid system, the power of an engine is transmitted to a first rotary electric machine (first motor generator) and is used to generate electric power, while part of the power of the engine is also transmitted to drive wheels via a power split mechanism.

The vehicle described in International Application Publication No. 2013/114594 is allowed to travel by setting both a first rotary electric machine and a second rotary electric machine in a motoring state while stopping an engine. In this case, the torque of each of the two motor generators is used as torque for rotating drive wheels. However, with the configuration of the vehicle described in the International Application Publication No. 2013/114594, such a driving method is allowed only when the rotation speed of the engine is zero. When the engine is rotated, the vehicle is operated in the above-described series-parallel hybrid mode, so the first rotary electric machine is used to generate electric power. Because the first rotary electric machine is in a regeneration state, torque during motoring of the first rotary electric machine cannot be directly used to rotate the drive wheels.

Even when the rotation speed of the engine is not zero, but when the torque of the first rotary electric machine is allowed to be directly used to rotate the drive wheels, it is desirable because it is possible to increase driving torque of the vehicle.

SUMMARY OF THE INVENTION

The invention provides a hybrid vehicle that has an increased number of opportunities that the torque of each of two motor generators is used to drive a wheel.

An aspect of the invention provides a hybrid vehicle. The hybrid vehicle includes an internal combustion engine, a first rotary electric machine, a second rotary electric machine, a power transmission unit, a differential unit, a clutch and a controller.

The second rotary electric machine is configured to output power to a drive wheel. The power transmission unit includes an input element and an output element. The input element is configured to receive power from the internal combustion engine. The output element is configured to output power input to the input element. The power transmission unit is configured to switch between a non-neutral state where power is transmitted between the input element and the output element and a neutral state where power is not transmitted between the input element and the output element.

The differential unit includes a first rotating element, a second rotating element and a third rotating element. The first rotating element is connected to the first rotary electric machine. The second rotating element is connected to the second rotary electric machine and the drive wheel. The third rotating element is connected to the output element of the power transmission unit. The differential unit is configured such that, when rotation speeds of any two of the first rotating element, the second rotating element and the third rotating element are determined, a rotation speed of the remaining one of the first rotating element, the second rotating element and the third rotating element is determined.

The clutch is configured to switch between an engaged state where power is transmitted from the internal combustion engine to the first rotary electric machine and a released state where transmission of power from the internal combustion engine to the first rotary electric machine is interrupted. Power from the internal combustion engine is transmitted to the first rotary electric machine though at least one of a first path or a second path. The first path is a path through which power is transmitted from the internal combustion engine to the first rotary electric machine via the power transmission unit and the differential unit, and the second path is a path through which power is transmitted from the internal combustion engine to the first rotary electric machine via a path different from the first path. The clutch is provided in the second path.

The controller is configured to (i) control the internal combustion engine, the first rotary electric machine, the power transmission unit and the clutch, and (ii) set the power transmission unit to the non-neutral state, set the clutch to the engaged state, and then cause the vehicle to travel by using driving force from the first rotary electric machine and driving force from the second rotary electric machine.

With the above-described hybrid vehicle, the vehicle is configured as described above, and the power transmission unit, the clutch, the first rotary electric machine and the second rotary electric machine are controlled as described above. Thus, the vehicle is allowed to be propelled by operating both the first rotary electric machine and the second rotary electric machine to carry out motoring even in a state where the rotation speed of the internal combustion engine is not zero. Therefore, it is possible to increase the opportunity that the torque of the two rotary electric machines is used as driving torque of the vehicle, so the flexibility of control over the vehicle increases in the case where large driving force is required during traveling.

In the hybrid vehicle, the controller may be configured to switch a drive mode of the vehicle between a first mode and a second mode in response to a vehicle speed. The first mode is a drive mode in which a rotation speed of the internal combustion engine is fixed to zero, the clutch is set to the released state and then the vehicle is caused to travel by using driving force from the first rotary electric machine and driving force from the second rotary electric machine. The second mode is a drive mode in which the power transmission unit is set to the non-neutral state, the clutch is set to the engaged state and then the vehicle is caused to travel by using driving force from the first rotary electric machine and driving force from the second rotary electric machine.

With the above-described hybrid vehicle, because the second mode is provided as the drive mode, even when the rotation speed of the engine is not zero like a transition from a state where the engine is operated to an EV mode, the vehicle is allowed to travel with large driving force using driving force from the first rotary electric machine and driving force from the second rotary electric machine.

In the hybrid vehicle, the controller may be configured to (i) when the vehicle speed is lower than a determination threshold, set the drive mode to the first mode, and (ii) when the vehicle speed is higher than the determination threshold, set the drive mode to the second mode.

With the above-described hybrid vehicle, when the drive mode is selected as described above, even when the vehicle speed increases and the vehicle is not allowed to travel in first mode because of the limitation of the rotation speed of the first rotary electric machine, the vehicle is allowed to travel with large driving force using driving force from the first rotary electric machine and driving force from the second rotary electric machine when the second mode is used.

In the hybrid vehicle, the controller may be configured to (i) in third mode that is the drive mode of the vehicle, set the power transmission unit to the non-neutral state, set the clutch to the released state, and then cause the first rotary electric machine to generate electric power in a state where the internal combustion engine is operated, and cause the second rotary electric machine to generate driving force for propelling the vehicle, and (ii) when the drive mode is changed from the third mode to the first mode, change the drive mode via the second mode.

With the above-described hybrid vehicle, when the drive mode is changed from the third mode to the first mode, it is possible not to cause a driver to experience a feeling of output torque loss by changing the drive mode via the second mode.

In the hybrid vehicle, the controller may be configured to, when fuel is not supplied to the internal combustion engine in the case where the vehicle is caused to travel in second mode, change open or close timing of at least one of an intake valve or exhaust valve such that resistance is reduced during rotation of the internal combustion engine.

When the vehicle is caused to travel in second mode and fuel is not supplied to the internal combustion engine, the internal combustion engine is forcibly rotated by the first rotary electric machine and the second rotary electric machine. In this case, an energy loss is smaller when the rotation resistance of the internal combustion engine is small. In order to reduce the rotation resistance of the internal combustion engine, it is desirable that the compressibility and expansion coefficient of air in a cylinder be small. Therefore, with the above-described hybrid vehicle, the controller reduces the rotation resistance of the internal combustion engine by changing the open/close timing of the intake valve or exhaust valve, thus reducing an energy loss.

In the hybrid vehicle, the controller may be configured to set the power transmission unit to the non-neutral state, set the clutch to the engaged state, and then cause the vehicle to travel by using driving force from the internal combustion engine in addition to driving force from the first rotary electric machine and driving force from the second rotary electric machine.

With the above-described hybrid vehicle, through the above-described control, it is possible to further increase the maximum driving force of the vehicle as compared to the EV mode in which the internal combustion engine is stopped and the first rotary electric machine and the second rotary electric machine are operated to carry out motoring.

In the hybrid vehicle, the controller may be configured to, in fourth mode as the drive mode of the vehicle, set the power transmission unit to the non-neutral state, set the clutch to the engaged state, and then cause the vehicle to travel by using driving force from the internal combustion engine in a state where the first rotary electric machine and the second rotary electric machine are not caused to generate torque.

With the above-described hybrid vehicle, through the above-described control, in an operating range in which the internal combustion engine is efficiently operable, the power of the internal combustion engine is allowed to be directly transmitted to the drive wheel without being converted to electric power, so it is possible to improve fuel economy.

In the hybrid vehicle, the controller may be configured to, in fifth mode as the drive mode of the vehicle, set the power transmission unit to the neutral state, set the clutch to the engaged state, and then cause the first rotary electric machine to generate electric power by using power of the internal combustion engine, and cause the second rotary electric machine to generate driving force for propelling the vehicle.

With the above-described hybrid vehicle, in the above-described series HV mode, a shock at a startup of the internal combustion engine is interrupted by the power transmission unit in the neutral state, and is not transmitted to the drive wheel. Thus, it is possible to reduce a shock at a startup of the internal combustion engine, which is experienced by a user.

In the hybrid vehicle, the power transmission unit may be configured to be able to change the ratio of a rotation speed of the input element to a rotation speed of the output element.

With the above-described hybrid vehicle, it is possible to increase the state of the vehicle where it is possible to set the EV mode in which large driving force is generated by operating both the two rotary electric machines to carry out motoring.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a chart that shows each drive mode in the hybrid vehicle and controlled statuses of clutches and brake of a transmission unit in each drive mode;

FIG. 6 is a nomograph for illustrating an operation of a one-motor EV mode (E1 line in FIG. 5) in the hybrid vehicle;

DETAILED DESCRIPTION OF EMBODIMENTS

Figure 1:
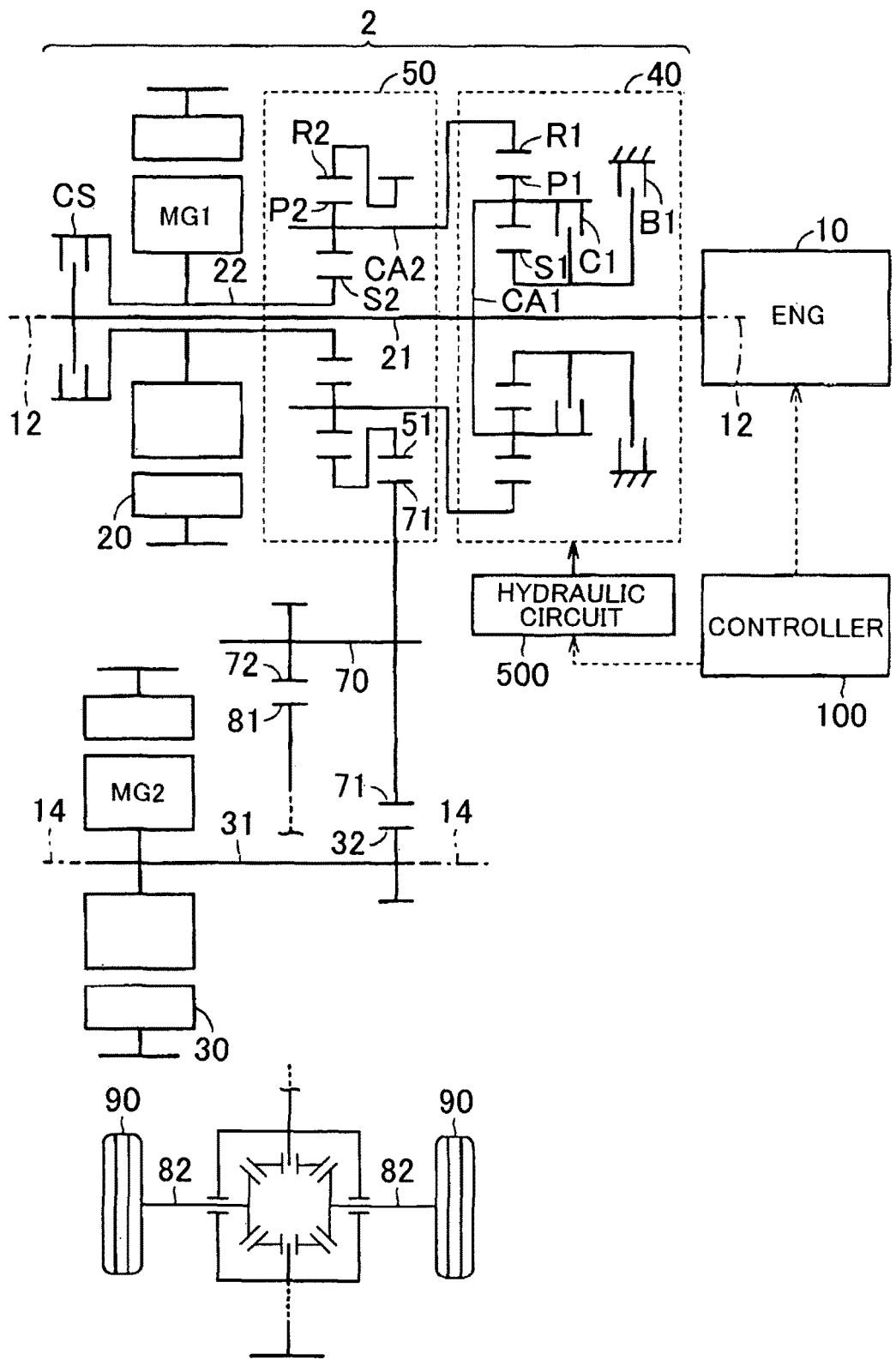
FIG. 1 is a view that shows the overall configuration of a hybrid vehicle including a drive system according to an embodiment of the invention.

Hereinafter, an embodiment of the invention will be described with reference to the accompanying drawings. Like reference numerals denote the same or corresponding portions in the following embodiment, and the description thereof will not be repeated.

FIG. 1 is a view that shows the overall configuration of a hybrid vehicle including a drive system according to the embodiment of the invention.

As shown in FIG. 1, the hybrid vehicle 1 (hereinafter, also referred to as vehicle 1) includes an engine 10, the drive system 2, drive wheels 90 and a controller 100. The drive system 2 includes a first motor generator (hereinafter, referred to as first MG) 20 that is a first rotary electric machine, a second motor generator (hereinafter, referred to as second MG) 30 that is a second rotary electric machine, a transmission unit 40, a differential unit 50, a clutch CS, an input shaft 21, a counter shaft 70 that is an output shaft of the drive system 2, a differential gear set 80 and a hydraulic circuit 500.

The hybrid vehicle 1 is a front-engine front-drive (FF) hybrid vehicle that travels by using the power of at least any one of the engine 10, the first MG 20 or the second MG 30. The hybrid vehicle 1 may be a plug-in hybrid vehicle of which an in-vehicle battery (not shown) is rechargeable from an external power supply.

The engine 10 is, for example, an internal combustion engine, such as a gasoline engine and a diesel engine. Each of the first MG 20 and the second MG 30 is, for example, a permanent magnet synchronous motor that includes a rotor in which permanent magnets are embedded. The drive system 2 is a double-axis drive system in which the first MG 20 is provided along a first axis 12 coaxial with the crankshaft of the engine 10 and the second MG 30 is provided along a second axis 14 different from the first axis 12. The first axis 12 and the second axis 14 are parallel to each other.

The transmission unit 40, the differential unit 50 and the clutch CS are further provided along the first axis 12. The transmission unit 40, the differential unit 50, the first MG 20 and the clutch CS are arranged from the side close to the engine 10 in the stated order.

The first MG 20 is provided so as to be able to receive power from the engine 10. More specifically, the input shaft 21 of the drive system 2 is connected to the crankshaft of the engine 10. The input shaft 21 extends along the first axis 12 in a direction away from the engine 10. The input shaft 21 is connected to the clutch CS at its distal end extending from the engine 10. A rotary shaft 22 of the first MG 20 extends in a cylindrical shape along the first axis 12. The input shaft 21 passes through the inside of the rotary shaft 22 at a portion before the input shaft 21 is connected to the clutch CS. The input shaft 21 is connected to the rotary shaft 22 of the first MG 20 via the clutch CS.

The clutch CS is provided in a power transmission path from the engine 10 to the first MG 20. The clutch CS is a hydraulic friction engagement element that is able to couple the input shaft 21 to the rotary shaft 22 of the first MG 20. When the clutch CS is placed in an engaged state; the input shaft 21 and the rotary shaft 22 are coupled to each other, and transmission of power from the engine 10 to the first MG 20 is allowed. When the clutch CS is placed in a released state, coupling of the input shaft 21 to the rotary shaft 22 is released, and transmission of power from the engine 10 to the first MG 20 via the clutch CS is interrupted.

The transmission unit 40 shifts power from the engine 10 and then outputs the power to the differential unit 50. The transmission unit 40 includes a single-pinion-type planetary gear mechanism, a clutch C1 and a brake B1. The single-pinion-type planetary gear mechanism includes a sun gear S1, pinions P1, a ring gear R1 and a carrier CA1.

The sun gear S1 is provided such that the rotation center of the sun gear S1 coincides with the first axis 12. The ring gear R1 is provided coaxially with the sun gear S1 on the radially outer side of the sun gear S1. The pinions P1 are arranged between the sun gear S1 and the ring gear R1, and are in mesh with the sun gear S1 and the ring gear R1. The pinions P1 are rotatably supported by the carrier CA1. The carrier CA1 is connected to the input shaft 21, and rotates integrally with the input shaft 21. Each of the pinions P1 is provided so as to be revolvable about the first axis 12 and rotatable around the central axis of the pinion P1.

As shown in FIG. 6 to FIG. 13 (described later), the rotation speed of the sun gear S1, the rotation speed of the carrier CA1 (that is, the rotation speed of the engine 10) and the rotation speed of the ring gear R1 are in the relationship represented by points that are connected by a straight line in each of the nomographs (that is, the relationship that, when any two rotation speeds are determined, the remaining one rotation speed is also determined).

In the present embodiment, the carrier CA1 is provided as an input element to which power is input from the engine 10, and the ring gear R1 is provided as an output element that outputs the power input to the carrier CA1. By the use of the planetary gear mechanism including the sun gear S1, the pinions P1, the ring gear R1 and the carrier CA1, power input to the carrier CA1 is shifted and output from the ring gear R1.

The clutch C1 is a hydraulic friction engagement element that is able to couple the sun gear S1 to the carrier CA1. When the clutch C1 is placed in an engaged state, the sun gear S1 and the carrier CA1 are coupled to each other, and rotate integrally with each other. When the clutch C1 is placed in a released state, integral rotation of the sun gear S1 and the carrier CA1 is cancelled.

The brake B1 is a hydraulic friction engagement element that is able to restrict (lock) the rotation of the sun gear S1. When the brake B1 is placed in an engaged state, the sun gear S1 is fixed to the case body of the drive system, and the rotation of the sun gear S1 is restricted. When the brake B1 is placed in a released state (disengaged state), the sun gear S1 is separated from the case body of the drive system, and the rotation of the sun gear S1 is allowed.

A separating wall W1 is provided between the planetary gear mechanism and the brake B1. It is preferable to provide the separating wall W1 at this position, because it is possible to provide an oil passage in the separating wall W1 in order to supply activating oil of the brake B1 and the clutch C1. Furthermore, a hole which is provided in the separating wall W1 can be small by providing the separating wall W1, the brake B1, the clutch C1 and the engine 10 in this described order and by making the carrier CA1 serve as an inner rotating element and the sun gear S1 serve as an outer rotating element.

A speed ratio (the ratio of the rotation speed of the carrier CA1 that is the input element to the rotation speed of the ring gear R1 that is the output element, specifically, Rotation Speed of Carrier CA1/Rotation Speed of Ring Gear R1) of the transmission unit 40 is changed in response to a combination of the engaged/released states of the clutch C1 and brake B1. When the clutch C1 is engaged and the brake B1 is released, a low gear position Lo in which the speed ratio is 1.0 (directly coupled state) is established. When the clutch C1 is released and the brake B1 is engaged, a high gear position Hi in which the speed ratio is smaller than 1.0 (for example, 0.7, and a so-called over-drive state) is established. When the clutch C1 is engaged and the brake B1 is engaged, the rotation of the sun gear S1 and the rotation of the carrier CA1 are restricted, so the rotation of the ring gear R1 is also restricted.

The transmission unit 40 is configured to be able to switch between a non-neutral state and a neutral state. In the non-neutral state, power is transmitted. In the neutral state, power is not transmitted. In the present embodiment, the above-described directly coupled state and over-drive state correspond to the non-neutral state. On the other hand, when both the clutch C1 and the brake B1 are released, the carrier CA1 is allowed to coast about the first axis 12. Thus, the neutral state in which power transmitted from the engine 10 to the carrier CA1 is not transmitted from the carrier CA1 to the ring gear R1 is obtained.

The differential unit 50 includes a single-pinion-type planetary gear mechanism and a counter drive gear 51. The single-pinion-type planetary gear mechanism includes a sun gear S2, pinions P2, a ring gear R2 and a carrier CA2.

The sun gear S2 is provided such that the rotation center of the sun gear S2 coincides with the first axis 12. The ring gear R2 is provided coaxially with the sun gear S2 on the radially outer side of the sun gear S2. The pinions P2 are arranged between the sun gear S2 and the ring gear R2, and are in mesh with the sun gear S2 and the ring gear R2. The pinions P2 are rotatably supported by the carrier CA2. The carrier CA2 is connected to the ring gear R1 of the transmission unit 40, and rotates integrally with the ring gear R1. Each of the pinions P2 is provided so as to be revolvable about the first axis 12 and rotatable around the central axis of the pinion P2.

The rotary shaft 22 of the first MG 20 is connected to the sun gear S2. The rotary shaft 22 of the first MG 20 rotates integrally with the sun gear S2. The counter drive gear 51 is connected to the ring gear R2. The counter drive gear 51 is an output gear of the differential unit 50. The output gear rotates integrally with the ring gear R2.

As shown in FIG. 6 to FIG. 13 (described later), the rotation speed of the sun gear S2 (that is, the rotation speed of the first MG 20), the rotation speed of the carrier CA2 and the rotation speed of the ring gear R2 are in the relationship represented by points that are connected by a straight line in each of the nomographs (that is, the relationship that, when any two rotation speeds are determined, the remaining one rotation speed is also determined). Therefore, when the rotation speed of the carrier CA2 is a predetermined value, it is possible to steplessly change the rotation speed of the ring gear R2 by adjusting the rotation speed of the first MG 20.

The counter shaft 70 extends parallel to the first axis 12 and the second axis 14. The counter shaft 70 is arranged parallel to the rotary shaft 22 of the first MG 20 and a rotary shaft 31 of the second MG 30. A driven gear 71 and a drive gear 72 are provided on the counter shaft 70. The driven gear 71 is in mesh with the counter drive gear 51 of the differential unit 50. That is, the power of the engine 10 and the power of the first MG 20 are transmitted to the counter shaft 70 via the counter drive gear 51 of the differential unit 50.

The transmission unit 40 and the differential unit 50 are connected in series with each other in a power transmission path from the engine 10 to the counter shaft 70. Therefore, power from the engine 10 is shifted in the transmission unit 40 and the differential unit 50 and then transmitted to the counter shaft 70.

The driven gear 71 is in mesh with a reduction gear 32 connected to the rotary shaft 31 of the second MG 30. That is, the power of the second MG 30 is transmitted to the counter shaft 70 via the reduction gear 32.

The drive gear 72 is in mesh with a differential ring gear 81 of the differential gear set 80. The differential gear set 80 is connected to the right and left drive wheels 90 via corresponding right and left drive shafts 82. That is, the rotation of the counter shaft 70 is transmitted to the right and left drive shafts 82 via the differential gear set 80.

With the above-described configuration in which the clutch CS is provided, the hybrid vehicle 1 is allowed to operate in a mode in which a series-parallel system is used (hereinafter, referred to as series-parallel mode) and is also allowed to operate in a mode in which a series system is used (hereinafter, referred to as series mode). In terms of this point, how power is transmitted from the engine in each mode will be described with reference to the schematic view shown in FIG. 2.

Figure 2:
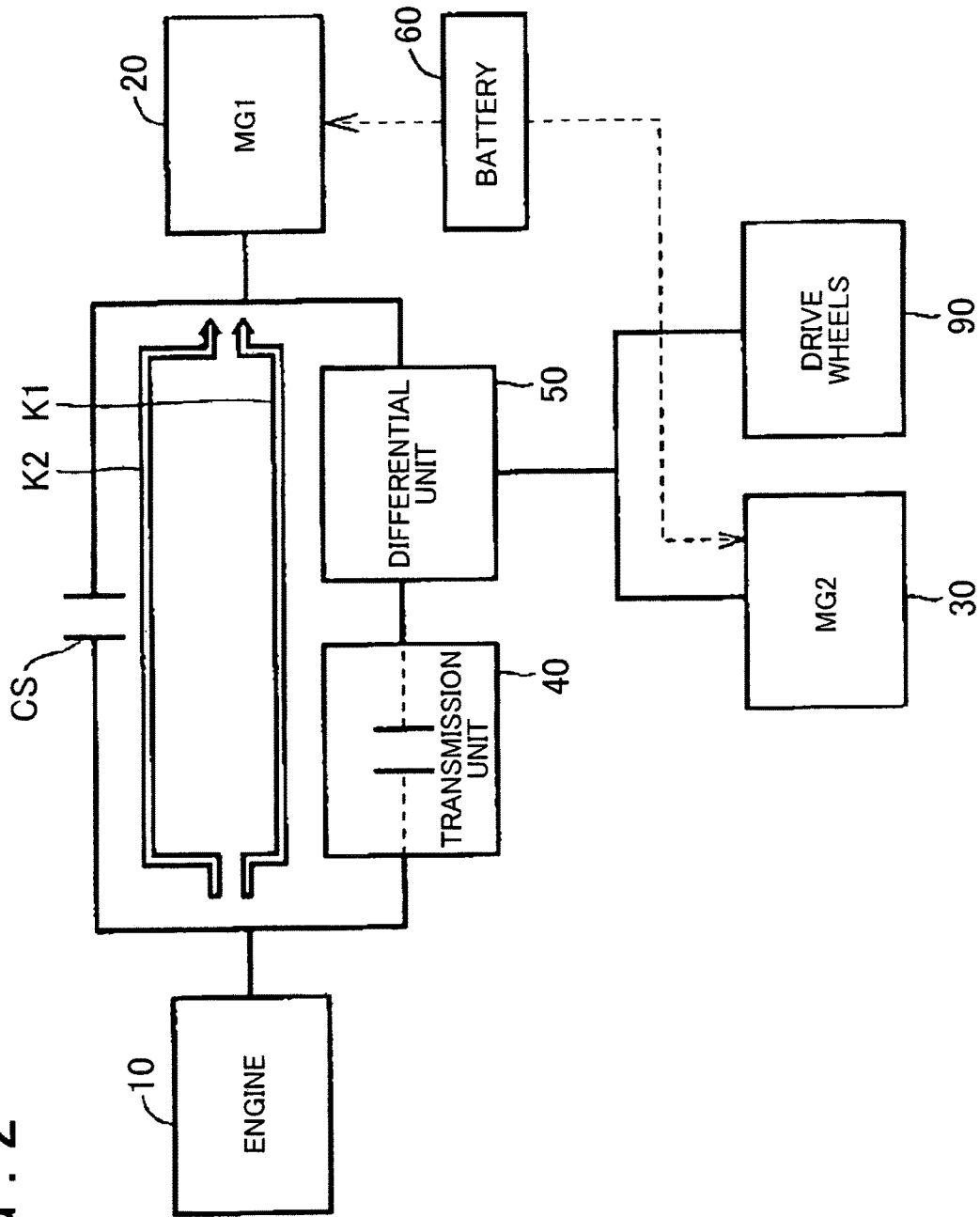
FIG. 2 is a block diagram that schematically shows power transmission paths of components of the vehicle in FIG. 1.

FIG. 2 is a block diagram that schematically shows power transmission paths of components of the vehicle in FIG. 1. As shown in FIG. 2, the hybrid vehicle 1 includes the engine 10, the first MG 20, the second MG 30, the transmission unit 40, the differential unit 50, a battery 60 and the clutch CS.

The second MG 30 is provided so as to be able to output power to the drive wheels 90. The transmission unit 40 includes the input element and the output element. The power of the engine 10 is input to the input element. The output element outputs the power input to the input element. The transmission unit 40 is configured to be able to switch between the non-neutral state and the neutral state. In the non-neutral state, power is transmitted between the input element and the output element. In the neutral state, power is not transmitted between the input element and the output element.

The battery 60 supplies electric power to the first MG 20 or the second MG 30 during motoring of a corresponding one of the first MG 20 and the second MG 30, and stores electric power generated by the first MG 20 or the second MG 30 during regeneration of a corresponding one of the first MG 20 and the second MG 30.

The differential unit 50 includes a first rotating element, a second rotating element and a third rotating element. The first rotating element is connected to the first MG 20. The second rotating element is connected to the second MG 30 and the drive wheels 90. The third rotating element is connected to the output element of the transmission unit 40. The differential unit 50 is configured as in the case of, for example, the planetary gear mechanism, or the like, such that, when the rotation speeds of any two of the first to third rotating elements are determined, the rotation speed of the remaining one of the first to third rotating elements is determined.

The hybrid vehicle 1 is configured to be able to transmit power from the engine 10 to the first MG 20 with the use of at least any one of two paths K1, K2 through which power is transmitted. The path K1 is a path through which power is transmitted from the engine 10 to the first MG 20 via the transmission unit 40 and the differential unit 50. The path K2 is different from the path K1, and is a path through which power is transmitted from the engine 10 to the first MG 20. The clutch CS is provided in the path K2, and is able to switch between the engaged state and the released state. In the engaged state, power is transmitted from the engine 10 to the first MG 20. In the released state, transmission of power from the engine 10 to the first MG 20 is interrupted.

In HV mode in which the engine is operated, any one of the clutch C1 and the brake B1 is placed in the engaged state, and the other one of the clutch C1 and the brake B1 is placed in the released state. Thus, when the transmission unit 40 is controlled to the non-neutral state, power is transmitted from the engine 10 to the first MG 20 through the path K1. At this time, when the clutch CS is placed in the released state to interrupt the path K2 at the same time, the vehicle is operable in series-parallel mode.

On the other hand, in HV mode in which the engine is operated, when power is transmitted through the path K2 by directly coupling the engine 10 to the first MG 20 with the clutch CS and the path K1 is interrupted by controlling the transmission unit 40 such that the transmission unit 40 is placed in the neutral state by placing both the clutch C1 and the brake B1 in the released state, the vehicle is operable in series mode. At this time, in the differential unit 50, the rotating element connected to the transmission unit 40 is freely rotatable, so the other two rotating elements do not influence each other and are rotatable. Therefore, it is possible to independently perform the operation of generating electric power by rotating the first MG 20 with the use of the rotation of the engine 10 and the operation of rotating the drive wheels by driving the second MG 30 with the use of generated electric power or electric power charged in the battery 60.

When the engine 10 and the first MG 20 are directly coupled to each other by the clutch CS and the transmission unit 40 is controlled to the non-neutral state in a state where the engine 10 is operated, the rotation of the engine 10 is transmitted to the drive wheels at a fixed gear ratio. At this time, power is not transmitted via a route, such as the paths K1, K2, but power is transmitted from the engine 10 to the drive wheels 90 via the differential unit 50.

The transmission unit 40 does not always need to be able to change the speed ratio. As long as it is possible to interrupt transmission of power between the engine 10 and the differential unit 50 in the path K1, a mere clutch is applicable.

Figure 3:
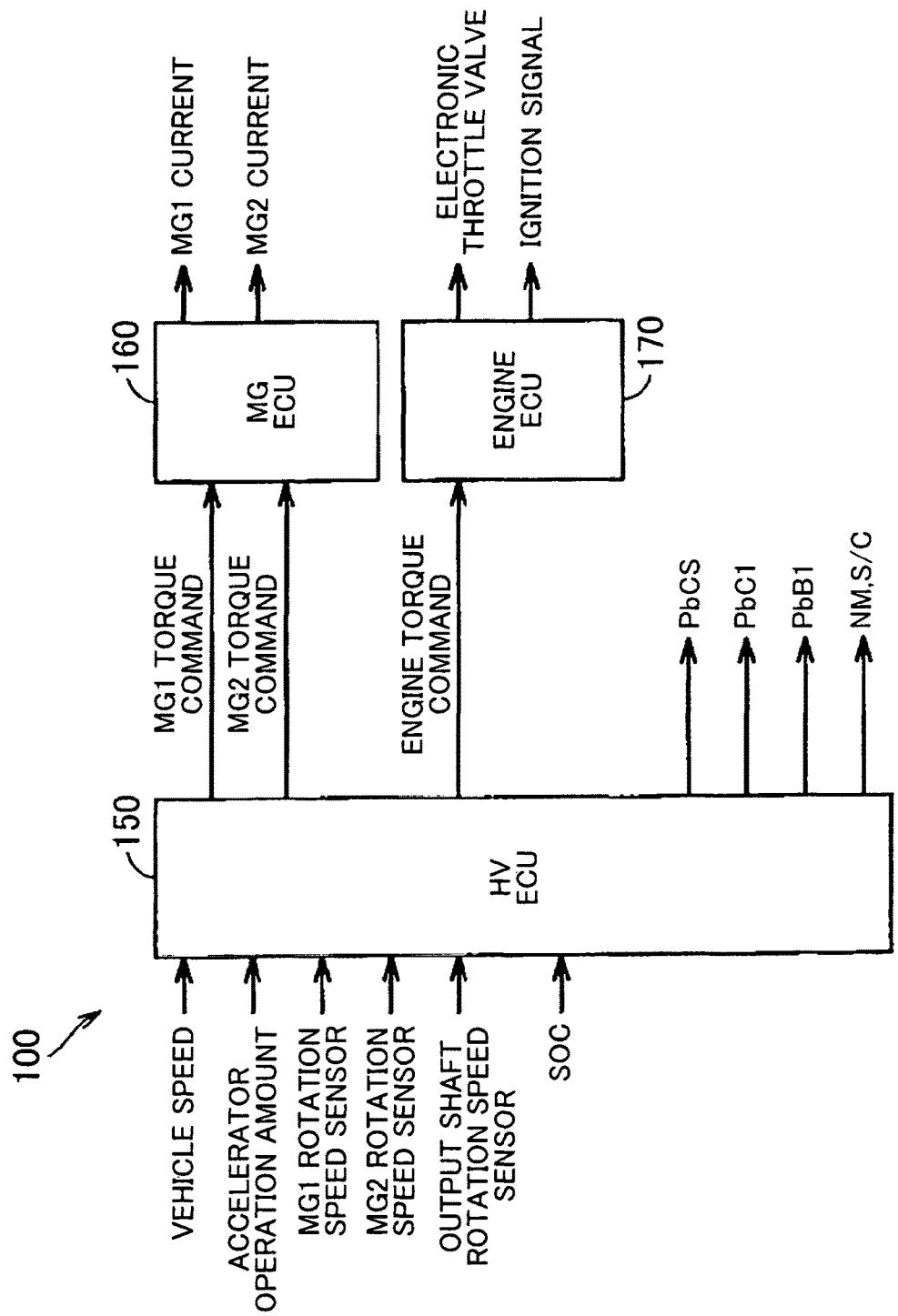
FIG. 3 is a block diagram that shows the configuration of a controller for the vehicle in FIG. 1.

FIG. 3 is a block diagram that shows the configuration of the controller 100 of the vehicle shown in FIG. 1. As shown in FIG. 3, the controller 100 includes an HV ECU 150, an MG ECU 160 and an engine ECU 170. Each of the HV ECU 150, the MG ECU 160 and the engine ECU 170 is an electronic control unit including a computer. The number of ECUs is not limited to three. An integrated single ECU may be provided as a whole, or two or four or more of split ECUs may be provided.

The MG ECU 160 controls the first MG 20 and the second MG 30. The MG ECU 160, for example, controls the output torque of the first MG 20 by adjusting the value of current that is supplied to the first MG 20, and controls the output torque of the second MG 30 by adjusting the value of current that is supplied to the second MG 30.

The engine ECU 170 controls the engine 10. The engine ECU 170, for example, controls the opening degree of an electronic throttle valve of the engine 10, controls ignition of the engine by outputting an ignition signal, or controls injection of fuel to the engine 10. The engine ECU 170 controls the output torque of the engine 10 through opening degree control over the electronic throttle valve, injection control, ignition control, and the like.

The HV ECU 150 comprehensively controls the entire vehicle. A vehicle speed sensor, an accelerator operation amount sensor, an MG1 rotation speed sensor, an MG2 rotation speed sensor, an output shaft rotation speed sensor, a battery sensor, and the like, are connected to the HV ECU 150. With these sensors, the HV ECU 150 acquires a vehicle speed, an accelerator operation amount, the rotation speed of the first MG 20, the rotation speed of the second MG 30, the rotation speed of the output shaft of a power transmission system, a battery state SOC, and the like.

The HV ECU 150 calculates a required driving force, a required power, a required torque, and the like, for the vehicle on the basis of acquired information. The HV ECU 150 determines the output torque of the first MG 20 (hereinafter, also referred to as MG1 torque), the output torque of the second MG 30 (hereinafter, also referred to as MG2 torque) and the output torque of the engine 10 (hereinafter, also referred to as engine torque) on the basis of the calculated required values. The HV ECU 150 outputs a command value of the MG1 torque and a command value of the MG2 torque to the MG ECU 160. The HV ECU 150 outputs a command value of the engine torque to the engine ECU 170.

The HV ECU 150 controls the clutches C1, CS and the brake B1 on the basis of the drive mode (described later), and the like. The HV ECU 150 outputs, to the hydraulic circuit 500 shown in FIG. 1, a command value (PbC1) of hydraulic pressure that is supplied to the clutch C1, a command value (PbCS) of hydraulic pressure that is supplied to the clutch CS and a command value (PbB1) of hydraulic pressure that is supplied to the brake B1. The HV ECU 150 outputs a control signal NM and a control signal S/C to the hydraulic circuit 500 shown in FIG. 1.

The hydraulic circuit 500 shown in FIG. 1 controls hydraulic pressures that are respectively supplied to the clutch C1 and the brake B1 in response to the command values PbC1, PbB1, controls an electric oil pump in response to the control signal NM, and controls whether to allow or prohibit simultaneous engagement of the clutch C1, the brake B1 and the clutch CS in response to the control signal S/C.

Figure 4:
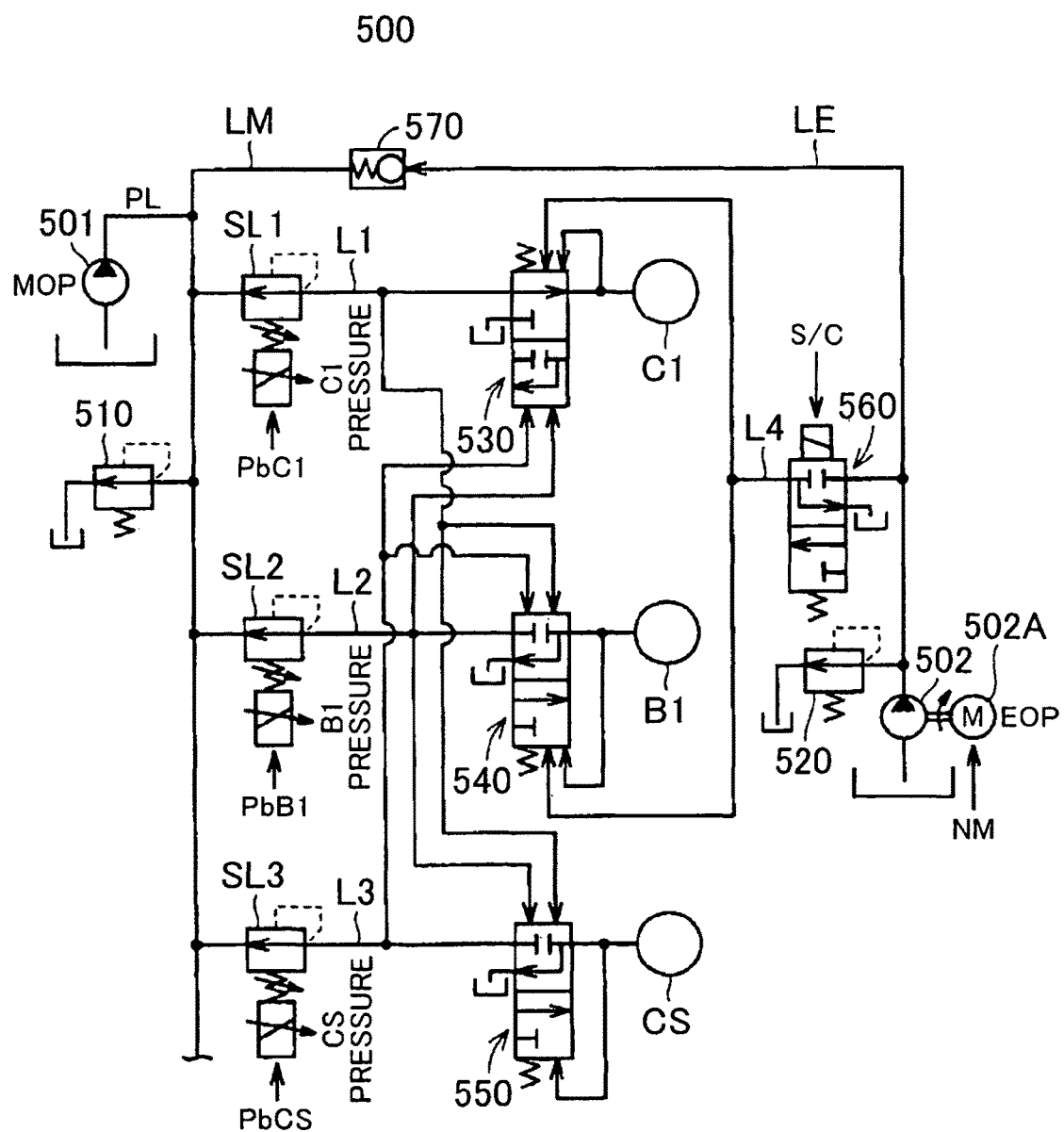
FIG. 4 is a view that schematically shows the configuration of a hydraulic circuit mounted on the hybrid vehicle shown in FIG. 1.

Next, the configuration of the hydraulic circuit will be described. FIG. 4 is a view that schematically shows the configuration of the hydraulic circuit 500 mounted on the hybrid vehicle 1. The hydraulic circuit 500 includes a mechanical oil pump (hereinafter, also referred to as MOP) 501, the electric oil pump (hereinafter, also referred to as EOP) 502, pressure regulating valves 510, 520, linear solenoid valves SL1, SL2, SL3, simultaneous supply prevention valves 530, 540, 550, an electromagnetic change-over valve 560, a check valve 570, and oil passages LM, LE, L1, L2, L3, L4.

The MOP 501 is driven by the rotation of the carrier CA2 of the differential unit 50 to generate hydraulic pressure. Therefore, when the carrier CA2 is rotated by, for example, driving the engine 10, the MOP 501 is also driven; whereas, when the carrier CA2 is stopped, the MOP 501 is also stopped. The MOP 501 outputs generated hydraulic pressure to the oil passage LM.

The hydraulic pressure in the oil passage LM is regulated (reduced) to a predetermined pressure by the pressure regulating valve 510. Hereinafter, the hydraulic pressure in the oil passage LM, regulated by the pressure regulating valve 510, is also referred to as line pressure PL. The line pressure PL is supplied to each of the linear solenoid valves SL1, SL2, SL3.

The linear solenoid valve SL1 generates hydraulic pressure for engaging the clutch C1 (hereinafter, referred to as C1 pressure) by regulating the line pressure PL in response to the hydraulic pressure command value PbC1 from the controller 100. The C1 pressure is supplied to the clutch C1 via the oil passage L1.

The linear solenoid valve SL2 generates hydraulic pressure for engaging the brake B1 (hereinafter, referred to as B1 pressure) by regulating the line pressure PL in response to the hydraulic pressure command value PbB1 from the controller 100. The B1 pressure is supplied to the brake B1 via the oil passage L2.

The linear solenoid valve SL3 generates hydraulic pressure for engaging the clutch CS (hereinafter, referred to as CS pressure) by regulating the line pressure PL in response to the hydraulic pressure command value PbCS from the controller 100. The CS pressure is supplied to the clutch CS via the oil passage L3.

The simultaneous supply prevention valve 530 is provided in the oil passage L1, and is configured to prevent the clutch C1 and at least one of the brake B1 or the clutch CS from being simultaneously engaged. Specifically, the oil passages L2, L3 are connected to the simultaneous supply prevention valve 530. The simultaneous supply prevention valve 530 operates by using the B1 pressure and the CS pressure through the oil passages L2, L3 as signal pressures.

When both signal pressures that are the B1 pressure and the CS pressure are not input to the simultaneous supply prevention valve 530 (that is, when both the brake B1 and the clutch CS are released), the simultaneous supply prevention valve 530 is in a normal state in which the C1 pressure is supplied to the clutch C1. FIG. 4 illustrates the case where the simultaneous supply prevention valve 530 is in the normal state.

On the other hand, when at least one of the signal pressures that are the B1 pressure and the CS pressure is input to the simultaneous supply prevention valve 530 (that is, when at least one of the brake B1 or the clutch CS is engaged), even when the clutch C1 is engaged, the simultaneous supply prevention valve 530 switches into a drain state in which supply of the C1 pressure to the clutch C1 is cut off and the hydraulic pressure in the clutch C1 is released to the outside. Thus, the clutch C1 is released, so the clutch C1 and at least one of the brake B1 or the clutch CS are prevented from being simultaneously engaged.

Similarly, the simultaneous supply prevention valve 540 operates in response to the C1 pressure and the CS pressure as signal pressures to prevent the brake B1 and at least one of the clutch C1 or the clutch CS from being simultaneously engaged. Specifically, when both the signal pressures that are the C1 pressure and the CS pressure are not input to the simultaneous supply prevention valve 540, the simultaneous supply prevention valve 540 is in a normal state in which the B1 pressure is supplied to the brake B1. On the other hand, when at least one of the signal pressures that are the C1 pressure and the CS pressure is input to the simultaneous supply prevention valve 540, the simultaneous supply prevention valve 540 switches into a drain state in which supply of the B1 pressure to the brake B1 is cut off and the hydraulic pressure in the brake B1 is released to the outside. FIG. 4 illustrates the case where the C1 pressure is input to the simultaneous supply prevention valve 540 as the signal pressure and the simultaneous supply prevention valve 540 is in the drain state.

Similarly, the simultaneous supply prevention valve 550 operates by using the C1 pressure and the B1 pressure as signal pressures to prevent the clutch CS and at least one of the clutch C1 or the brake B1 from being simultaneously engaged. Specifically, when both the signal pressures that are the C1 pressure and the B1 pressure are not input to the simultaneous supply prevention valve 550, the simultaneous supply prevention valve 550 is in a normal state in which the CS pressure is supplied to the clutch CS. On the other hand, when at least one of the signal pressures that are the C1 pressure and the B1 pressure is input to the simultaneous supply prevention valve 550, the simultaneous supply prevention valve 550 switches into a drain state in which supply of the CS pressure to the clutch CS is cut off and the hydraulic pressure in the clutch CS is released to the outside. FIG. 4 illustrates the case where the C1 pressure is input to the simultaneous supply prevention valve 550 and the simultaneous supply prevention valve 550 is in the drain state.

The EOP 502 is driven by a motor (hereinafter, also referred to as internal motor) 502A provided inside to generate hydraulic pressure. The internal motor 502A is controlled by the control signal NM from the controller 100. Therefore, the EOP 502 is operable irrespective of whether the carrier CA2 is rotating. The EOP 502 outputs generated hydraulic pressure to the oil passage LE.

The hydraulic pressure in the oil passage LE is regulated (reduced) to a predetermined pressure by the pressure regulating valve 520. The oil passage LE is connected to the oil passage LM via the check valve 570. When the hydraulic pressure in the oil passage LE is higher by a predetermined pressure or more than the hydraulic pressure in the oil passage LM, the check valve 570 opens, and the hydraulic pressure in the oil passage LE is supplied to the oil passage LM via the check valve 570. Thus, during a stop of the MOP 501 as well, it is possible to supply hydraulic pressure to the oil passage LM by driving the EOP 502.

The electromagnetic change-over valve 560 is switched to any one of an on state and an off state in response to the control signal S/C from the controller 100. In the on state, the electromagnetic change-over valve 560 communicates the oil passage LE with the oil passage L4. In the off state, the electromagnetic change-over valve 560 interrupts the oil passage LE from the oil passage L4, and releases the hydraulic pressure in the oil passage L4 to the outside. FIG. 4 illustrates the case where the electromagnetic change-over valve 560 is in the off state.

The oil passage L4 is connected to the simultaneous supply prevention valves 530, 540. When the electromagnetic change-over valve 560 is in the on state, the hydraulic pressure in the oil passage LE is input to the simultaneous supply prevention valves 530, 540 via the oil passage L4 as a signal pressure. When the signal pressure from the oil passage L4 is input to the simultaneous supply prevention valve 530, the simultaneous supply prevention valve 530 is forcibly fixed to the normal state irrespective of whether the signal pressure (B1 pressure) is input from the oil passage L2. Similarly, when the signal pressure is input from the oil passage L4 to the simultaneous supply prevention valve 540, the simultaneous supply prevention valve 540 is forcibly fixed to the normal state irrespective of whether the signal pressure (C1 pressure) is input from the oil passage L1. Therefore, by driving the EOP 502 and switching the electromagnetic change-over valve 560 to the on state, the simultaneous supply prevention valves 530, 540 are simultaneously fixed to the normal state. Thus, the clutch C1 and the brake B1 are allowed to be simultaneously engaged, and two-motor mode (described later) is enabled.

Hereinafter, the details of control modes of the hybrid vehicle 1 will be described with reference to an operation engagement chart and the nomographs.

FIG. 5 is a chart that shows each drive mode and controlled statuses of the clutch C1 and brake B1 of the transmission unit 40 in each drive mode.

The controller 100 causes the hybrid vehicle 1 to travel in motor drive mode (hereinafter, referred to as EV mode), hybrid mode (hereinafter, referred to as HV mode) or engine drive mode. The EV mode is a control mode in which the engine 10 is stopped and the hybrid vehicle 1 is caused to travel by using the power of at least one of the first MG 20 or the second MG 30. The HV mode is a control mode in which the hybrid vehicle 1 is caused to travel by using the power of the engine 10 and the power of the second MG 30. The engine drive mode is a control mode in which the first MG 20 and the second MG 30 are not used and the vehicle is caused to travel by using the driving force of the engine 10. Each of the EV mode, the HV mode and the engine drive mode is further divided into some control modes.

In FIG. 5, C1, B1, CS, MG1 and MG2 respectively denote the clutch C1, the brake B1, the clutch CS, the first MG 20 and the second MG 30. The circle mark (○) in each of the C1, B1, CS columns indicates the engaged state, the cross mark (×) indicates the released state, and the triangle mark (Δ) indicates that any one of the clutch C1 and the brake B1 is engaged during engine brake. The sign G in each of the MG1 column and the MG2 column indicates that the MG1 or the MG2 is mainly operated as a generator. The sign M in each of the MG1 column and the MG2 column indicates that the MG1 or the MG2 is mainly operated as a motor.

In EV mode, the controller 100 selectively switches between one-motor mode and two-motor mode in response to a user's required torque, and the like. In one-motor mode, the hybrid vehicle 1 is caused to travel by using the power of the second MG 30 alone. In two-motor mode, the hybrid vehicle 1 is caused to travel by using the power of both the first MG 20 and the second MG 30.

When the load of the drive system 2 is low, the one-motor mode is used. When the load of the drive system 2 becomes high, the drive mode is changed to the two-motor mode.

As shown in E1 line of FIG. 5, when the hybrid vehicle 1 is driven (moved forward or reversed) in one-motor EV mode, the controller 100 places the transmission unit 40 in the neutral state (state in which no power is transmitted) by releasing the clutch C1 and releasing the brake B1. At this time, the controller 100 causes the first MG 20 to mainly operate as fixing means for fixing the rotation speed of the sun gear S2 to zero and causes the second MG 30 to mainly operate as a motor (see FIG. 6 (described later)). In order to cause the first MG 20 to operate as the fixing means, the current of the first MG 20 may be controlled by feeding back the rotation speed of the first MG 20 such that the rotation speed becomes zero. When the rotation speed of the first MG 20 is kept zero even when torque is zero, cogging torque may be utilized without adding current. When the transmission unit 40 is placed in the neutral state, the engine 10 is not co-rotated during regenerative braking, so a loss is smaller by that amount, and it is possible to recover large regenerated electric power.

As shown in the E2 line in FIG. 5, when the hybrid vehicle 1 is braked in one-motor EV mode and engine brake is required, the controller 100 engages any one of the clutch C1 and the brake B1. For example, when braking force is insufficient with only regenerative brake, engine brake is used together with regenerative brake. For example, when the SOC of the battery 60 is close to a full charge state, regenerated electric power cannot be charged, so it is conceivable to establish an engine brake state.

By engaging any one of the clutch C1 and the brake B1, a so-called engine brake state is established. In the engine brake state, the rotation of the drive wheels 90 is transmitted to the engine 10, and the engine 10 is rotated. At this time, the controller 100 causes the first MG 20 to mainly operate as a motor, and causes the second MG 30 to mainly operate as a generator.

On the other hand, as shown in the E3 line in FIG. 5, when the hybrid vehicle 1 is driven (moved forward or reversed) in two-motor EV mode, the controller 100 restricts (locks) the rotation of the ring gear R1 of the transmission unit 40 by engaging the clutch C1 and engaging the brake B1. Thus, the rotation of the carrier CA2 of the differential unit 50 coupled to the ring gear R1 of the transmission unit 40 is also restricted (locked), so the carrier CA2 of the differential unit 50 is kept in a stopped state (Engine Rotation Speed Ne=0). The controller 100 causes the first MG 20 and the second MG 30 to mainly operate as motors (see FIG. 7 (described later)).

In EV mode (one-motor mode or two-motor mode), the engine 10 is stopped, so the MOP 501 is also stopped. Therefore, in EV mode, the clutch C1 or the brake B1 is engaged by using hydraulic pressure that is generated by the EOP 502.

E4 and E5 lines in EV mode will be described. These modes as well as E3 line are two-motor modes, and differ from E3 line in that these modes are operable even when the engine rotation speed Ne is not zero (Ne free in FIG. 5). The details of these modes will be described later with reference to the nomograph of FIG. 10.

The HV mode may be divided into three modes, that is, a series-parallel mode, a series mode and a parallel mode. In series-parallel mode or series mode, the controller 100 causes the first MG 20 to operate as a generator, and causes the second MG 30 to operate as a motor. In parallel mode, the controller 100 causes only the second MG 30 to operate as a motor (one-motor mode) or causes both the first MG 20 and the second MG 30 to operate as motors (two-motor mode).

In HV mode, the controller 100 sets the control mode to any one of the series-parallel mode, the series mode and the parallel mode.

In series-parallel mode, part of the power of the engine 10 is used in order to drive the drive wheels 90, and the remaining part of the power of the engine 10 is used as power for generating electric power in the first MG 20. The second MG 30 drives the drive wheels 90 by using electric power generated by the first MG 20. In series-parallel mode, the controller 100 changes the speed ratio of the transmission unit 40 in response to the vehicle speed.

Figure 8:
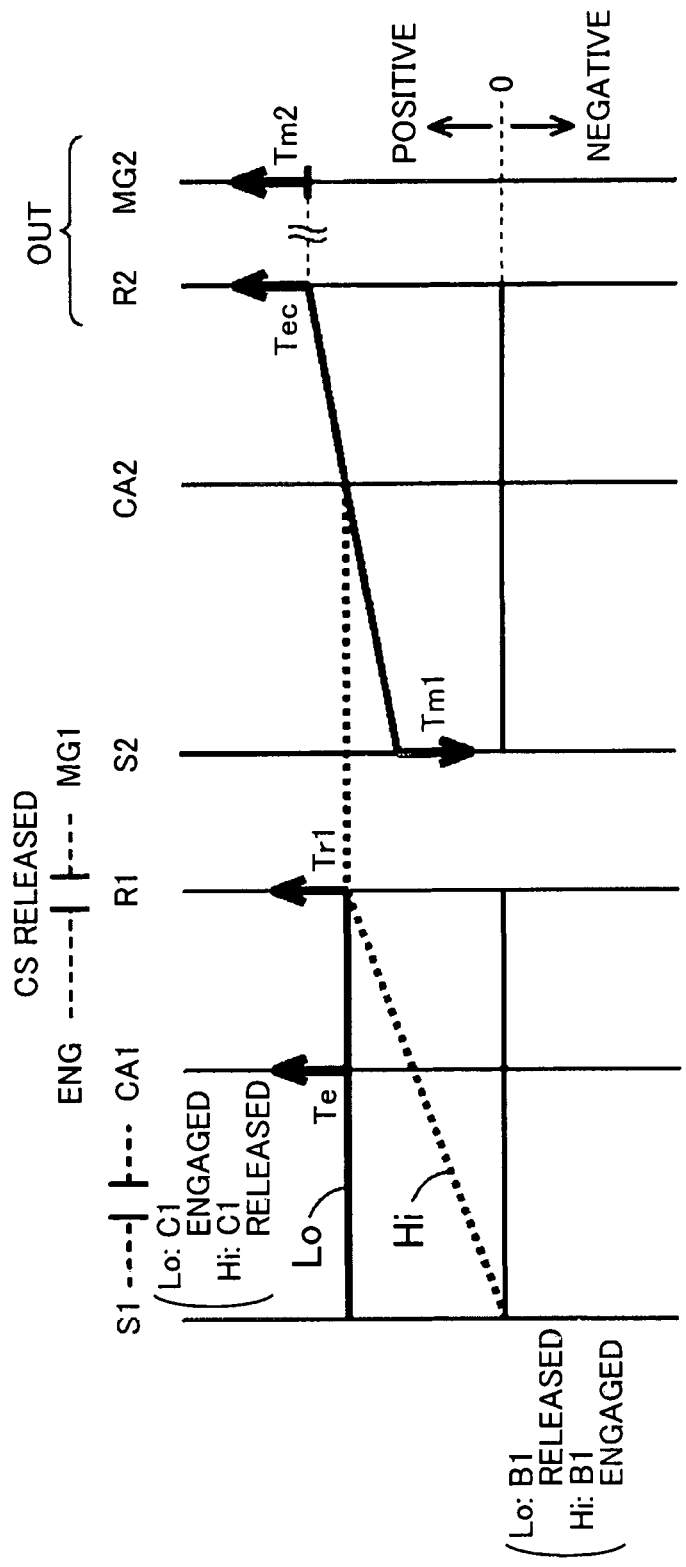
FIG. 8 is a nomograph for illustrating an operation of a (series-parallel) HV mode (H1, H2 lines in FIG. 5) in the hybrid vehicle.

When the hybrid vehicle 1 is caused to move forward in an intermediate or low speed range, the controller 100 establishes the low gear position Lo (see the continuous line in FIG. 8 (described later)) by engaging the clutch C1 and releasing the brake B1 as shown in the H2 line in FIG. 5. On the other hand, when the hybrid vehicle 1 is caused to move forward in a high speed range, the controller 100 establishes the high gear position Hi (see the dashed line in FIG. 8 (described later)) by releasing the clutch C1 and engaging the brake B1 as shown in the H1 line in FIG. 5. Either when the high gear position is established or when the low gear position is established, the transmission unit 40 and the differential unit 50 operate as a continuously variable transmission as a whole.

When the hybrid vehicle 1 is reversed, the controller 100 engages the clutch C1 and releases the brake B1 as shown in the H3 line in FIG. 5. When there is an allowance in the SOC of the battery, the controller 100 rotates the second MG 30 alone in the reverse direction; whereas, when there is no allowance in the SOC of the battery, the controller 100 generates electric power with the use of the first MG 20 by operating the engine 10 and rotates the second MG 30 in the reverse direction.

In series mode, the entire power of the engine 10 is used as power for generating electric power with the use of the first MG 20. The second MG 30 drives the drive wheels 90 by using electric power generated by the first MG 20. In series mode, when the hybrid vehicle 1 is moved forward or when the hybrid vehicle 1 is reversed, the controller 100 releases both the clutch C1 and the brake B1 and engages the clutch CS (see FIG. 9 (described later)) as shown in the H4 line and the H5 line in FIG. 5.

In HV mode, the engine 10 is operating, so the MOP 501 is also operating. Therefore, in HV mode, the clutch C1, the clutch CS or the brake B1 is engaged mainly by using hydraulic pressure generated by the MOP 501.

The controlled statuses in parallel HV mode are shown in H6 to H9 lines. These are also the HV mode; however, the first MG 20 does not operate as a generator. The two-motor (parallel) HV mode significantly differs from the series-parallel mode or the series mode in that the first MG 20 operates to carry out motoring as a motor and outputs torque for rotating the drive wheels. In parallel mode, any one of the clutch C1 and the brake B1 is engaged, the other one of the clutch C1 and the brake B1 is released, and the clutch CS is engaged. The details of these modes will be described later with reference to the nomograph of FIG. 13.

The vehicle 1 is able to travel in engine drive mode in which the vehicle 1 travels without using the first MG 20 or the second MG 30. When the traveling state of the vehicle coincides with a rotation speed and a torque where the efficiency of the engine is high, the efficiency is high when the power of the engine is directly used to rotate the drive wheels without using the power of the engine for power generation, or the like. The controlled statuses in engine drive mode are shown in Z1 and Z2 lines in FIG. 5. In engine drive mode, as well as the parallel HV mode, any one of the clutch C1 and the brake B1 is engaged, the other one of the clutch C1 and the brake B1 is released, and the clutch CS is engaged. The details of these modes will be described later with reference to the nomographs of FIG. 12 and FIG. 13.

Hereinafter, the statuses of the rotating elements in typical modes among the operation modes shown in FIG. 5 will be described with reference to the nomographs.

Figure 7:
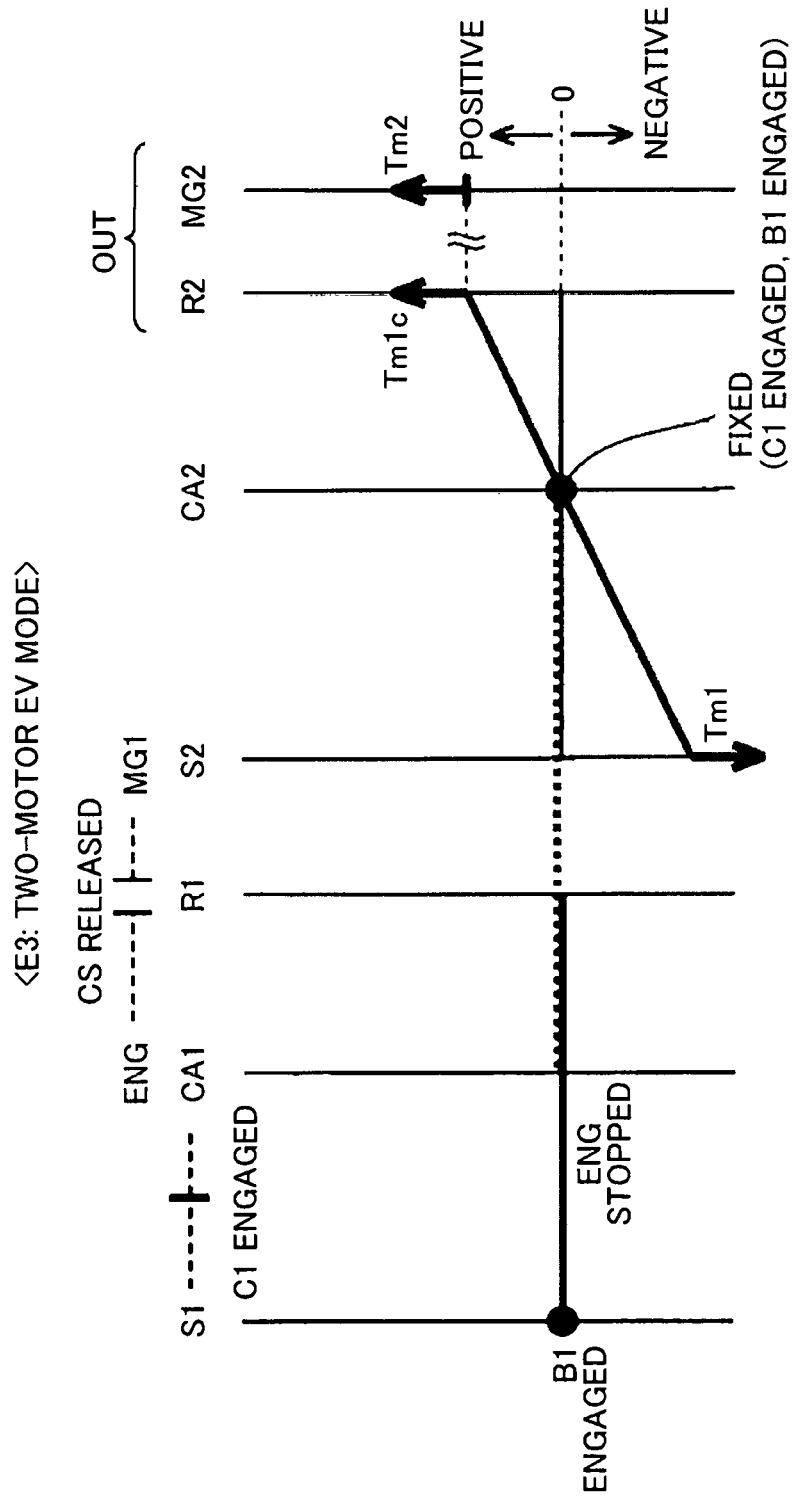
FIG. 7 is a nomograph for illustrating an operation of a two-motor EV mode (E3 line in FIG. 5) in the hybrid vehicle.
Figure 9:
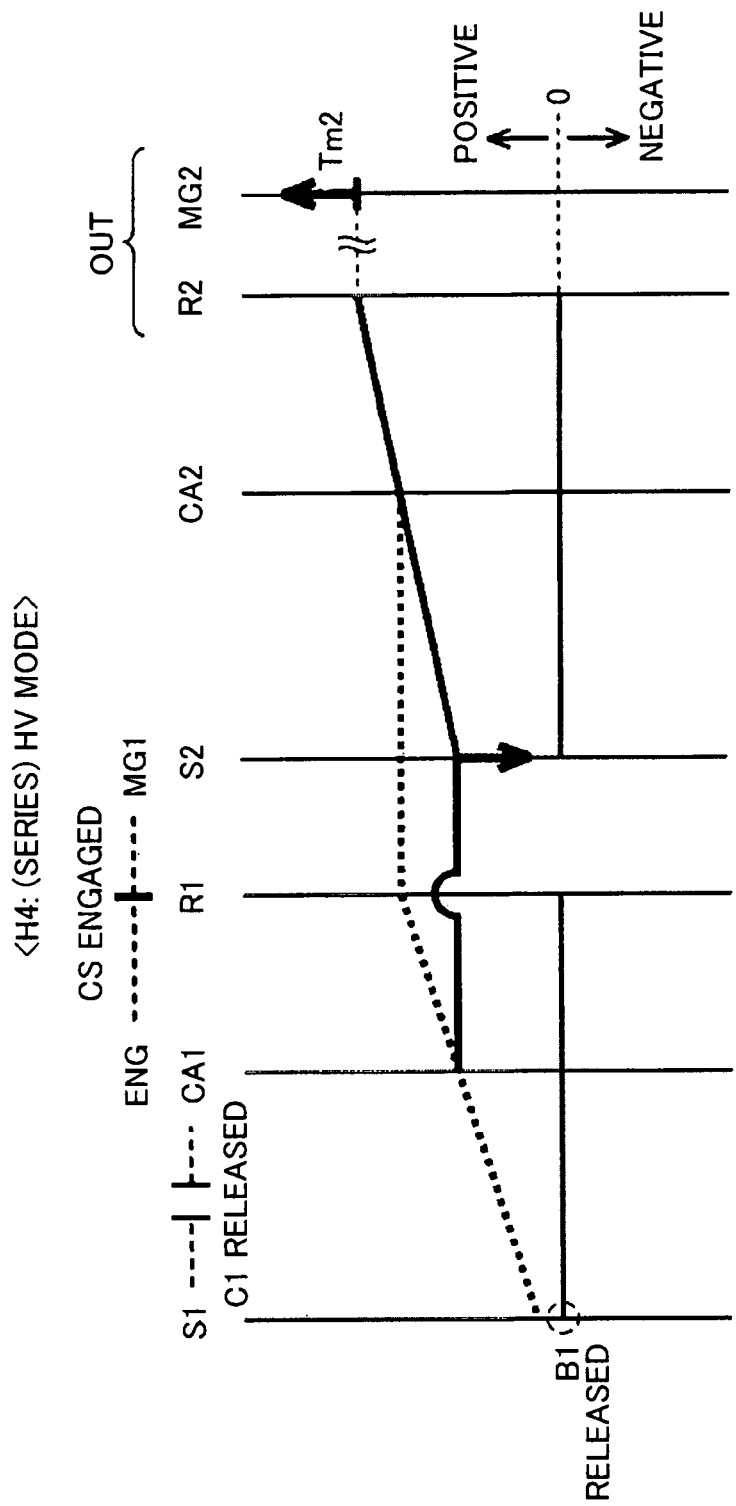
FIG. 9 is a nomograph for illustrating an operation of a (series) HV mode (H4 line in FIG. 5) in the hybrid vehicle.

FIG. 6 is a nomograph for illustrating the operation of the one-motor EV mode (E1 line in FIG. 5). FIG. 7 is a nomograph for illustrating the operation of the two-motor EV mode (E3 line in FIG. 5). FIG. 8 is a nomograph for illustrating the operation of the series-parallel HV mode (H1, H2 lines in FIG. 5). FIG. 9 is a nomograph for illustrating the operation of the series HV mode (H4 line in FIG. 5).

In FIG. 6 to FIG. 9, S1, CA1 and R1 respectively denote the sun gear S1, the carrier CA1 and the ring gear R1 of the transmission unit 40, S2, CA2 and R2 respectively denote the sun gear S2, the carrier CA2 and the ring gear R2 of the differential unit 50.

The controlled statuses in one-motor EV mode (E1 line in FIG. 5) will be described with reference to FIG. 6. In one-motor EV mode, the controller 100 releases the clutch C1, the brake B1 and the clutch CS of the transmission unit 40, stops the engine 10, and causes the second MG 30 to mainly operate as a motor. Therefore, in one-motor EV mode, the hybrid vehicle 1 travels by using the torque of the second MG 30 (hereinafter, referred to as MG2 torque Tm2).

At this time, the controller 100 executes feedback control over the torque of the first MG 20 (hereinafter, referred to as MG1 torque Tm1) such that the rotation speed of the sun gear S2 becomes zero. Therefore, the sun gear S2 does not rotate. However, because the clutch C1 and brake B1 of the transmission unit 40 are released, the rotation of the carrier CA2 of the differential unit 50 is not restricted. Therefore, the ring gear R2 and carrier CA2 of the differential unit 50 and the ring gear R1 of the transmission unit 40 are rotated (coasted) interlocking with the rotation of the second MG 30 in the same direction as the second MG 30.

On the other hand, the carrier CA1 of the transmission unit 40 is kept in a stopped state because the engine 10 is stopped. The sun gear S1 of the transmission unit 40 is rotated (coasted) interlocking with the rotation of the ring gear R1 in a direction opposite to the rotation direction of the ring gear R1.

In order to decelerate the vehicle in one-motor EV mode, it is allowed to activate engine brake in addition to regenerative brake using the second MG 30. In this case (E2 line in FIG. 5); by engaging any one of the clutch C1 and the brake B1, the engine 10 is also rotated at the time when the carrier CA2 is driven from the drive wheels 90 side, so engine brake is activated.

Next, the controlled status in two-motor EV mode (E3 line in FIG. 5) will be described with reference to FIG. 7. In two-motor EV mode, the controller 100 engages the clutch C1 and the brake B1, releases the clutch CS, and stops the engine 10. Therefore, the rotation of each of the sun gear S1, carrier CA1 and ring gear R1 of the transmission unit 40 is restricted such that the rotation speed becomes zero.

Because the rotation of the ring gear R1 of the transmission unit 40 is restricted, the rotation of the carrier CA2 of the differential unit 50 is also restricted (locked). In this state, the controller 100 causes the first MG 20 and the second MG 30 to mainly operate as motors. Specifically, the second MG 30 is rotated in the positive direction by setting the MG2 torque Tm2 to a positive torque, and the first MG 20 is rotated in the negative direction by setting the MG1 torque Tm1 to a negative torque.

When the rotation of the carrier CA2 is restricted by engaging the clutch C1, the MG1 torque Tm1 is transmitted to the ring gear R2 by using the carrier CA2 as a supporting point. The MG1 torque Tm1 (hereinafter, referred to as MG1 transmission torque Tm1c) that is transmitted to the ring gear R2 acts in the positive direction, and is transmitted to the counter shaft 70. Therefore, in two-motor EV mode, the hybrid vehicle 1 travels by using the MG1 transmission torque Tm1c and the MG2 torque Tm2. The controller 100 adjusts the distribution ratio between the MG1 torque Tm1 and the MG2 torque Tm2 such that the sum of the MG1 transmission torque Tm1c and the MG2 torque Tm2 meets the user's required torque.

The controlled state in series-parallel HV mode (H1 to H3 lines in FIG. 5) will be described with reference to FIG. 8. FIG. 8 illustrates the case where the vehicle is traveling forward in the low gear position Lo (see H2 line in FIG. 5, and the continuous common line shown in the nomograph of S1, CA1 and R1 in FIG. 8) and the case where the vehicle is traveling forward in the high gear position Hi (see H1 line in FIG. 5, and the dashed common line shown in the nomograph of S1, CA1 and R1 in FIG. 8). For the sake of convenience of description, it is assumed that the rotation speed of the ring gear R1 is the same either when the vehicle is traveling forward in the low gear position Lo or when the vehicle is traveling forward in the high gear position Hi.

When the low gear position Lo is established in series-parallel HV mode, the controller 100 engages the clutch C1, and releases the brake B1 and the clutch CS. Therefore, the rotating elements (the sun gear S1, the carrier CA1 and the ring gear R1) rotate integrally with one another. Thus, the ring gear R1 of the transmission unit 40 also rotates at the same rotation speed as the carrier CA1, and the rotation of the engine 10 is transmitted from the ring gear R1 to the carrier CA2 of the differential unit 50 at the same rotation speed. That is, the torque of the engine 10 (hereinafter, referred to as engine torque Te) input to the carrier CA1 of the transmission unit 40 is transmitted from the ring gear R1 of the transmission unit 40 to the carrier CA2 of the differential unit 50. When the low gear position Lo is established, the torque that is transmitted from the ring gear R1 (hereinafter, referred to as transmission unit output torque Tr1) is equal to the engine torque Te (Te=Tr1).

The rotation of the engine 10, transmitted to the carrier CA2 of the differential unit 50, is steplessly shifted by the use of the rotation speed of the sun gear S2 (the rotation speed of the first MG 20), and is transmitted to the ring gear R2 of the differential unit 50. At this time, the controller 100 basically causes the first MG 20 to operate as a generator to apply the MG1 torque Tm1 in the negative direction. Thus, the MG1 torque Tm1 serves as reaction force for transmitting the engine torque Te, input to the carrier CA2, to the ring gear R2.

The engine torque Te transmitted to the ring gear R2 (hereinafter, referred to as engine transmission torque Tec) is transmitted from the counter drive gear 51 to the counter shaft 70, and acts as driving force of the hybrid vehicle 1.

In series-parallel HV mode, the controller 100 causes the second MG 30 to mainly operate as a motor. The MG2 torque Tm2 is transmitted from the reduction gear 32 to the counter shaft 70, and acts as driving force of the hybrid vehicle 1. That is, in series-parallel HV mode, the hybrid vehicle 1 travels by using the engine transmission torque Tec and the MG2 torque Tm2.

On the other hand, when the high gear position Hi is established in series-parallel HV mode, the controller 100 engages the brake B1, and releases the clutch C1 and the clutch CS. Because the brake B1 is engaged, the rotation of the sun gear S1 is restricted. Thus, the rotation of the engine 10, input to the carrier CA1 of the transmission unit 40, is increased in speed, and is transmitted from the ring gear R1 of the transmission unit 40 to the carrier CA2 of the differential unit 50. Therefore, when the high gear position Hi is established, the transmission unit output torque Tr1 is smaller than the engine torque Te (Te>Tr1).

The controlled status in series HV mode (H4 line in FIG. 5) will be described with reference to FIG. 9. In series HV mode, the controller 100 releases the clutch C1 and the brake B1, and engages the clutch CS. Therefore, when the clutch CS is engaged, the sun gear S2 of the differential unit 50 rotates at the same rotation speed as the carrier CA1 of the transmission unit 40, and the rotation of the engine 10 is transmitted from the clutch CS to the first MG 20 at the same rotation speed. Thus, electric power is allowed to be generated with the use of the first MG 20 by using the engine 10 as a power source.

On the other hand, because both the clutch C1 and the brake B1 are released, the rotation of each of the sun gear S1 and ring gear R1 of the transmission unit 40 and the rotation of the carrier CA2 of the differential unit 50 are not restricted. That is, because the transmission unit 40 is in the neutral state and the rotation of the carrier CA2 of the differential unit 50 is not restricted, the power of the first MG 20 and the power of the engine 10 are not transmitted to the counter shaft 70. Therefore, the MG2 torque Tm2 of the second MG 30 is transmitted to the counter shaft 70. Accordingly, in series HV mode, while electric power is generated with the use of the first MG 20 by using the engine 10 as a power source, the hybrid vehicle 1 travels by using the MG2 torque Tm2 generated by the use of part or all of the generated electric power.

Because the series mode is allowed to be achieved, it is possible to select the operating point of the engine without concern for occurrence of tooth contact noise of the gear mechanism due to engine torque fluctuations, to which attention needs to be paid in series-parallel mode, when the vehicle travels at a low vehicle speed. Thus, a vehicle state that enables both quietness of the vehicle and improvement in fuel consumption increases.

In series HV mode, the controller 100 sets the transmission unit 40 to the neutral state and sets the clutch CS to the engaged state, and then causes the first MG 20 to generate electric power by the use of the power of the engine 10, and causes the second MG 30 to generate driving force for propelling the vehicle. In the above-described series HV mode, a shock at a startup of the engine 10 is interrupted by the transmission unit 40 in the neutral state, and is not transmitted to the drive wheels 90. Thus, it is possible to reduce a shock at a startup of the engine 10, which is experienced by a user.

Figure 10:
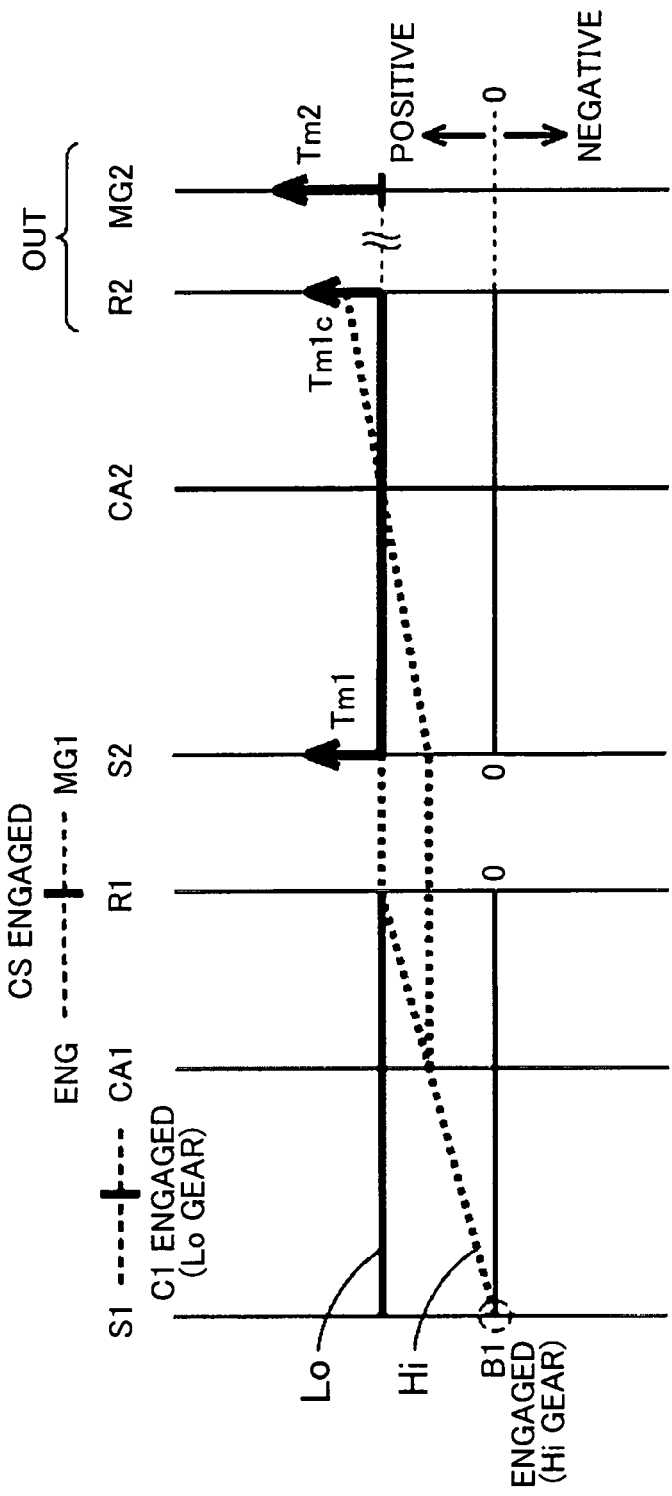
FIG. 10 is a nomograph for illustrating an operation of a two-motor EV mode (E4, E5 lines in FIG. 5) in the hybrid vehicle.

FIG. 10 is a nomograph for illustrating the operation of the two-motor EV mode (E4, E5 lines in FIG. 5). The controlled statuses in two-motor EV mode will be described with reference to FIG. 10. FIG. 10 illustrates the case where the vehicle is traveling forward in the low gear position Lo (see the continuous common lines) and the case where the vehicle is traveling in the high gear position Hi (see the dashed common lines). For the sake of convenience of description, it is assumed that the rotation speed of the ring gear R1 is the same either when the vehicle is traveling forward in the low gear position Lo or when the vehicle is traveling forward in the high gear position Hi.

When the low gear position Lo is established in two-motor EV mode (E5 line in FIG. 5), the controller 100 engages the clutch C1 and the clutch CS and releases the brake B1. Therefore, the rotating elements (the sun gear S1, the carrier CA1 and the ring gear R1) of the transmission unit 40 rotate integrally with one another. When the clutch CS is engaged, the carrier CA1 of the transmission unit 40 and the sun gear S2 of the differential unit 50 rotate integrally with each other. Thus, all the rotating elements of the transmission unit 40 and differential unit 50 rotate integrally at the same rotation speed. Therefore, when the MG1 torque Tm1 is generated in the positive rotation direction by the first MG 20 together with the second MG 30, it is possible to cause the hybrid vehicle 1 to travel by using both the motors. Because the engine 10 is not autonomously driven in EV mode, the engine 10 is in a driven state where the engine 10 is driven by the torque of both the first MG 20 and the second MG 30. Therefore, it is desirable that the open/close timing of each valve be operated such that resistance during rotation of the engine reduces.

The MG1 transmission torque Tm1c transmitted to the ring gear R2 is transmitted from the counter drive gear 51 to the counter shaft 70, and acts as the driving force of the hybrid vehicle 1. At the same time, the MG2 torque Tm2 is transmitted from the reduction gear 32 to the counter shaft 70, and acts as the driving force of the hybrid vehicle 1. That is, when the low gear position Lo is established in two-motor EV mode, the hybrid vehicle 1 travels by using the MG2 torque Tm2 and the MG1 torque Tm1 transmitted to the ring gear R2.

On the other hand, when the high gear position Hi is established in two-motor EV mode (E4 line in FIG. 5), the controller 100 engages the brake B1 and the clutch CS and releases the clutch C1. Because the brake B1 is engaged, the rotation of the sun gear S1 is restricted.

Because the clutch CS is engaged, the carrier CA1 of the transmission unit 40 and the sun gear S2 of the differential unit 50 rotate integrally with each other. Therefore, the rotation speed of the sun gear S2 is equal to the rotation speed of the engine 10.

Figure 11:
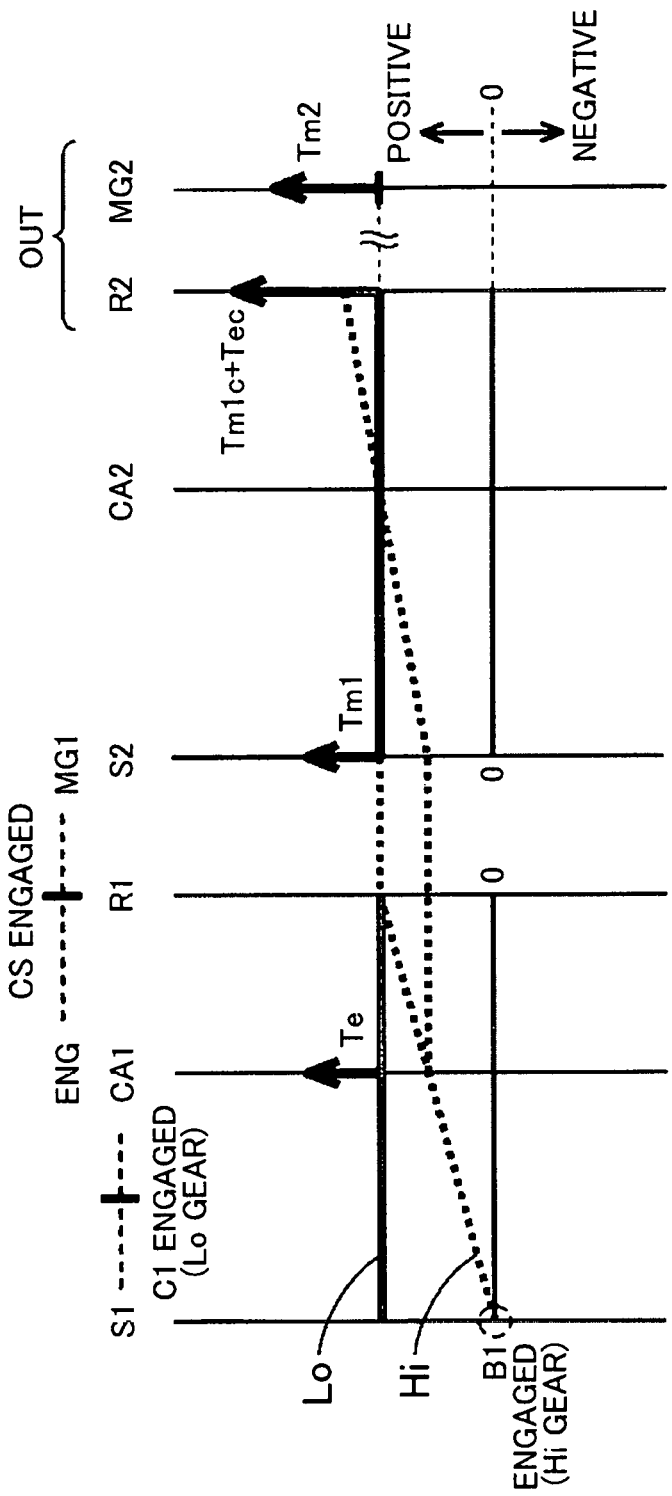
FIG. 11 is a nomograph for illustrating an operation of a (parallel) HV mode (H7, H9 lines in FIG. 5) in the hybrid vehicle.

FIG. 11 is a nomograph for illustrating the operation of the parallel HV mode (H7, H9 lines in FIG. 5). The controlled statuses in two-motor parallel stepped HV mode will be described with reference to FIG. 11. FIG. 11 illustrates the case where the vehicle is traveling forward in the low gear position Lo (see the continuous common lines) and the case where the vehicle is traveling in the high gear position Hi (see the dashed common lines).

As is apparent from the comparison between FIG. 10 and FIG. 11, in two-motor parallel stepped HV mode, the engine 10 is autonomously driven, so the engine torque Te is applied to the carrier CA1 shown in FIG. 11. Therefore, the engine torque Te is also added to the ring gear R2. The remaining points of the nomograph shown in FIG. 11 are the same as those of FIG. 10, so the description will not be repeated.

In two-motor parallel stepped HV mode, the engine torque Te, the MG1 torque Tm1 and the MG2 torque Tm2 all are allowed to be used for the forward rotation torque of the drive wheels, so it is particularly effective when a large torque is required of the drive wheels.

The controlled statuses in one-motor parallel: stepped HV mode (H6, H8 lines in FIG. 5) correspond to the case where Tm1=0 in FIG. 11. In parallel stepped HV mode, the vehicle is allowed to travel (engine drive mode) by setting Tm1=0 and Tm2=0 and using only engine torque.

Figure 12:
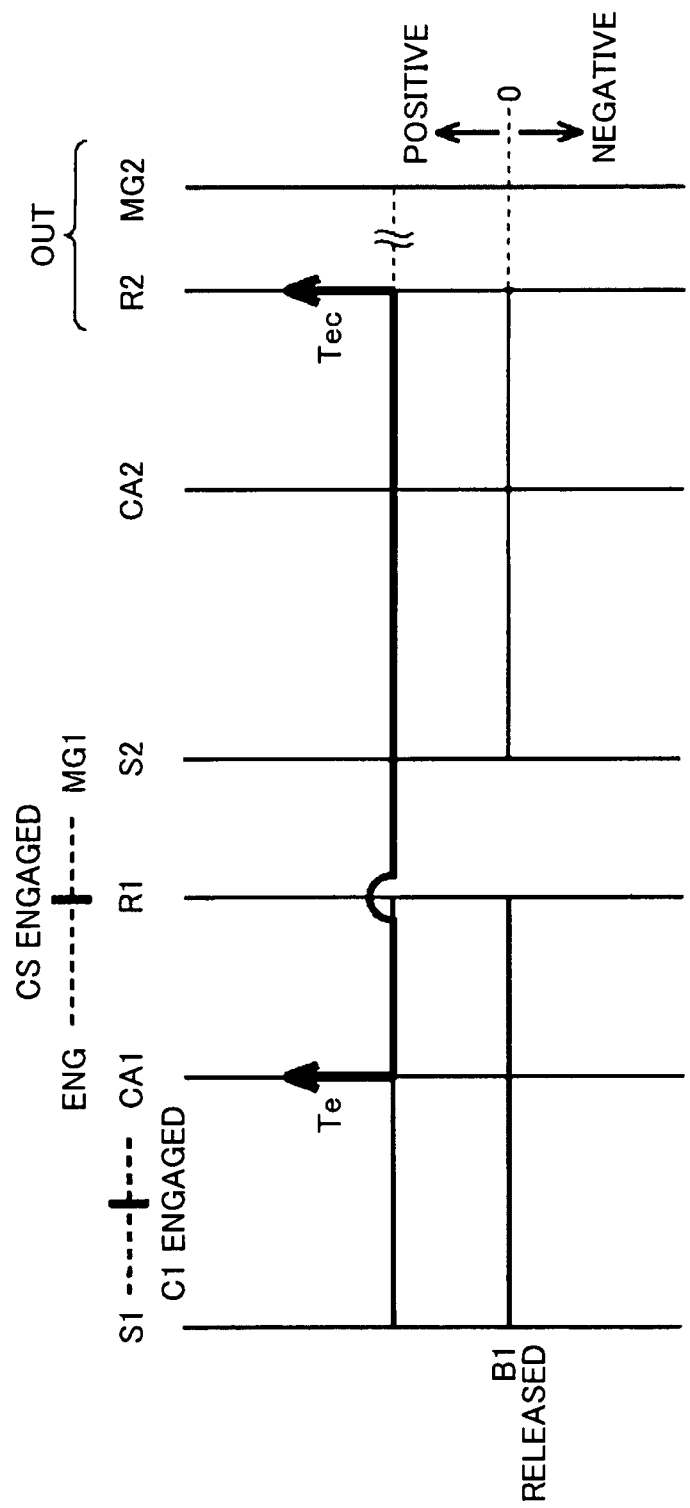
FIG. 12 is a nomograph for illustrating an operation of an engine drive mode (Z1 line in FIG. 5) in the hybrid vehicle.
Figure 13:
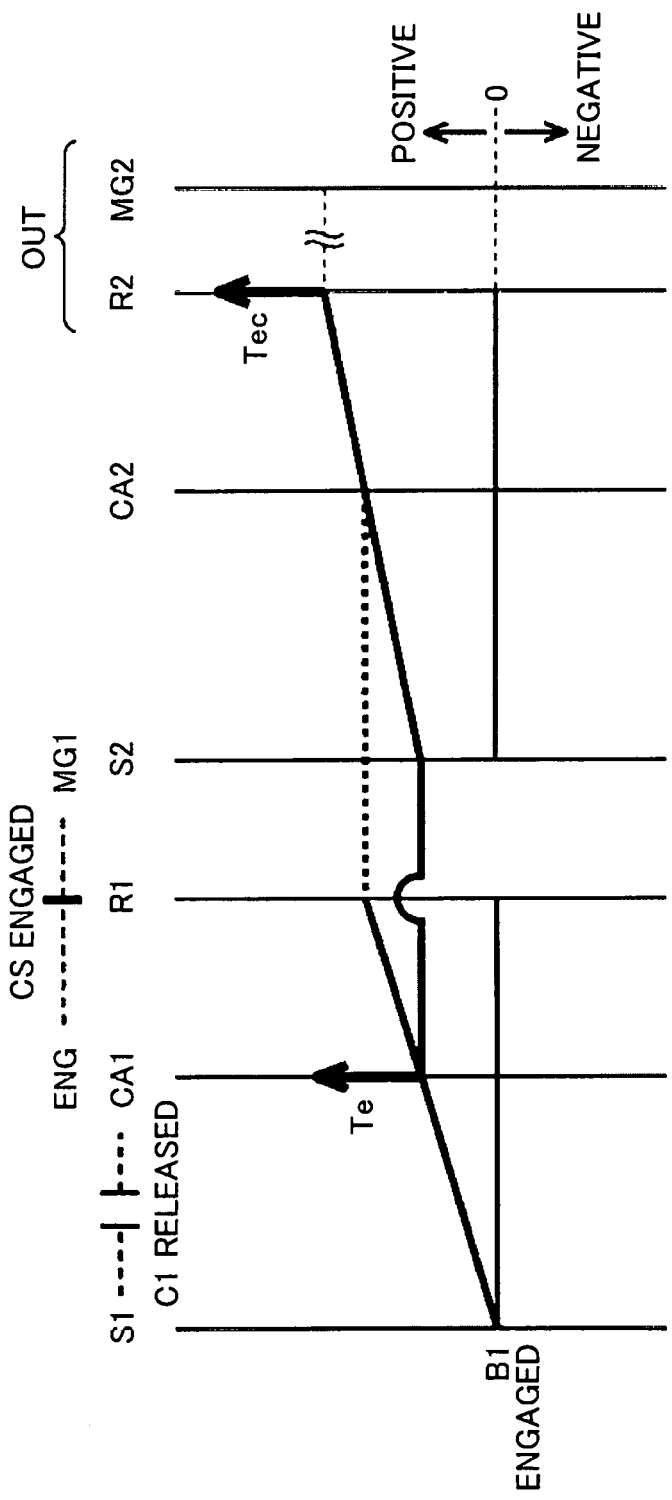
FIG. 13 is a nomograph for illustrating an operation of an engine drive mode (Z2 line in FIG. 5) in the hybrid vehicle.

FIG. 12 is a nomograph for illustrating the operation of the engine drive mode (Z1 in FIG. 5). FIG. 13 is a nomograph for illustrating the operation of the engine drive mode (Z2 in FIG. 5). The nomograph of FIG. 12 corresponds to a nomograph at the time when Tm1=0 and Tm2=0 in the nomograph indicated by the continuous lines in FIG. 11. The nomograph of FIG. 13 corresponds to a nomograph at the time when Tm1=0 and Tm2=0 in the nomograph indicated by the dashed lines in FIG. 11.

As shown in FIG. 12 and FIG. 13, the hybrid vehicle 1 further has the engine drive mode (Z1, Z2 lines in FIG. 5).

In engine drive mode (Z1, Z2 lines in FIG. 5), the controller 100 sets the transmission unit 40 to the non-neutral state and sets the clutch CS to the engaged state, and then causes the vehicle to travel by using the engine 10 in a state where torque is not generated by the first MG 20 or the second MG 30.

In this way, by setting the transmission unit 40 to a high-gear fixed position or a low-gear fixed position and engaging the clutch CS, it is possible to directly transmit the torque of the engine 10 to the drive shafts. Under the condition that the energy efficiency of the engine 10 is high, fuel economy is high when the engine drive mode is used.

With the above-described control, in a state where the engine 10 is efficiently operable, the power of the engine 10 is allowed to be directly transmitted to the drive wheels 90 without being converted to electric power, so it is possible to improve fuel economy.

Next, a difference in driving force among the drive modes will be described. As described above, the hybrid vehicle 1 according to the present embodiment is able to travel in many drive modes, such as the one-motor EV mode; the two-motor EV mode, the two-motor HV mode and the engine drive mode. For this reason, it is required to study which drive mode is used in what situation.

Figure 14:
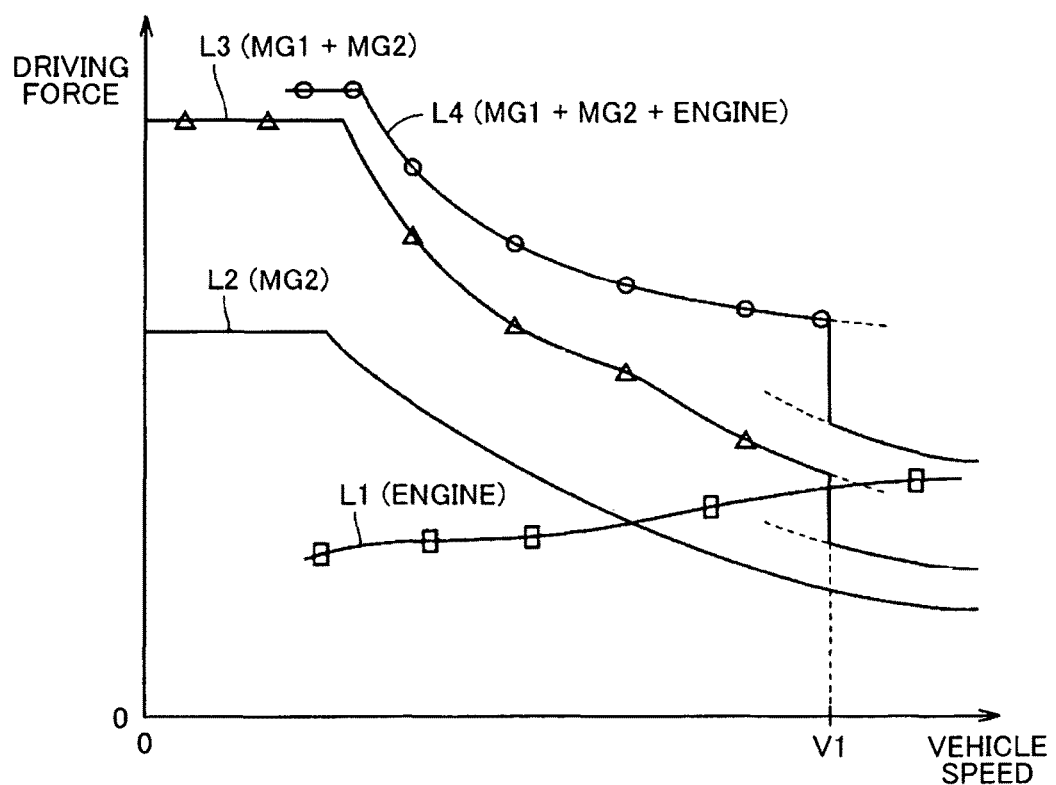
FIG. 14 is a graph that shows the relationship between a vehicle speed and a maximum driving force in each drive mode in the hybrid vehicle.

FIG. 14 is a graph that shows the relationship between a vehicle speed and a maximum driving force in each drive mode. In FIG. 14, the line L1 indicates the maximum driving force in engine drive mode, the line L2 indicates the maximum driving force in one-motor EV mode, the line L3 indicates the maximum driving force in two-motor EV mode, and the line L4 indicates the maximum driving force in two-motor parallel HV mode.

The line L1 indicates the driving force at the time when the engine is set to a maximum power in the case where the vehicle travels in engine drive mode while the engine is directly coupled to the output shaft (the gear position is Lo) as shown in FIG. 12. The line L2 indicates the driving force generated by the torque of only the second MG 30 as shown in FIG. 6.

The line L3 indicates the driving force generated by the torque of both the first MG 20 and the second MG 30 as shown in FIG. 7. However, when the vehicle speed exceeds V1, the maximum driving force reduces at a stroke. This is because, when the vehicle speed becomes V1, the rotation speed of the first MG 20 decreases in the negative direction in FIG. 7 and then reaches a limit value and, as a result, the operating state is changed. Specifically, when the vehicle speed is higher than V1, the clutch CS is engaged, and any one of the clutch C1 and the brake B1 is engaged and the other one of the clutch C1 and the brake B1 is released as shown in FIG. 10. Thus, the state of the first MG 20 is changed such that the first MG 20 generates positive torque, and the rotation speed is lower than that in the state of FIG. 7. In this state, because the torque of the first MG 20 is not increased by the planetary gear mechanism and there is a loss for idling of the engine 10, the driving force remarkably reduces in a stepwise manner at the vehicle speed V1.

When a driving force larger than that in two-motor mode indicated by the line L3 is required, the torque of the engine 10 is used in addition to the torque of both the first MG 20 and the second MG 30 as indicated by the line L4.

In this case, the controller 100 sets the transmission unit 40 to the non-neutral state and sets the clutch CS to the engaged state, and then causes the vehicle to travel by using driving force from the engine 10 in addition to driving force from the first MG 20 and driving force from the second MG 30 (H7, H9 lines in FIG. 5).

With the above-described control, it is possible to further increase the maximum driving force of the vehicle (the line L4 in FIG. 14) as compared to the EV mode (the line L3 in FIG. 14) in which the engine 10 is stopped and the first MG 20 and the second MG 30 are operated to carry out motoring.

When the gear position is switched at the vehicle speed V1, the Lo gear indicated by the continuous line in FIG. 11 is used when the vehicle speed is lower than V1, and the Hi gear indicated by the dashed line in FIG. 11 is used when the vehicle speed is higher than V1, with the result that the driving force reduces in a stepwise manner.

Next, control over the clutches and the brake in the case where the drive mode is changed to the two-motor EV mode will be described. In the above-description, the controlled statuses of the clutches C1, CS and brake B1 in each drive mode are mainly described. Hereinafter, control at the time of switching the drive mode in the case where the drive mode is changed will be described.

Figure 15:
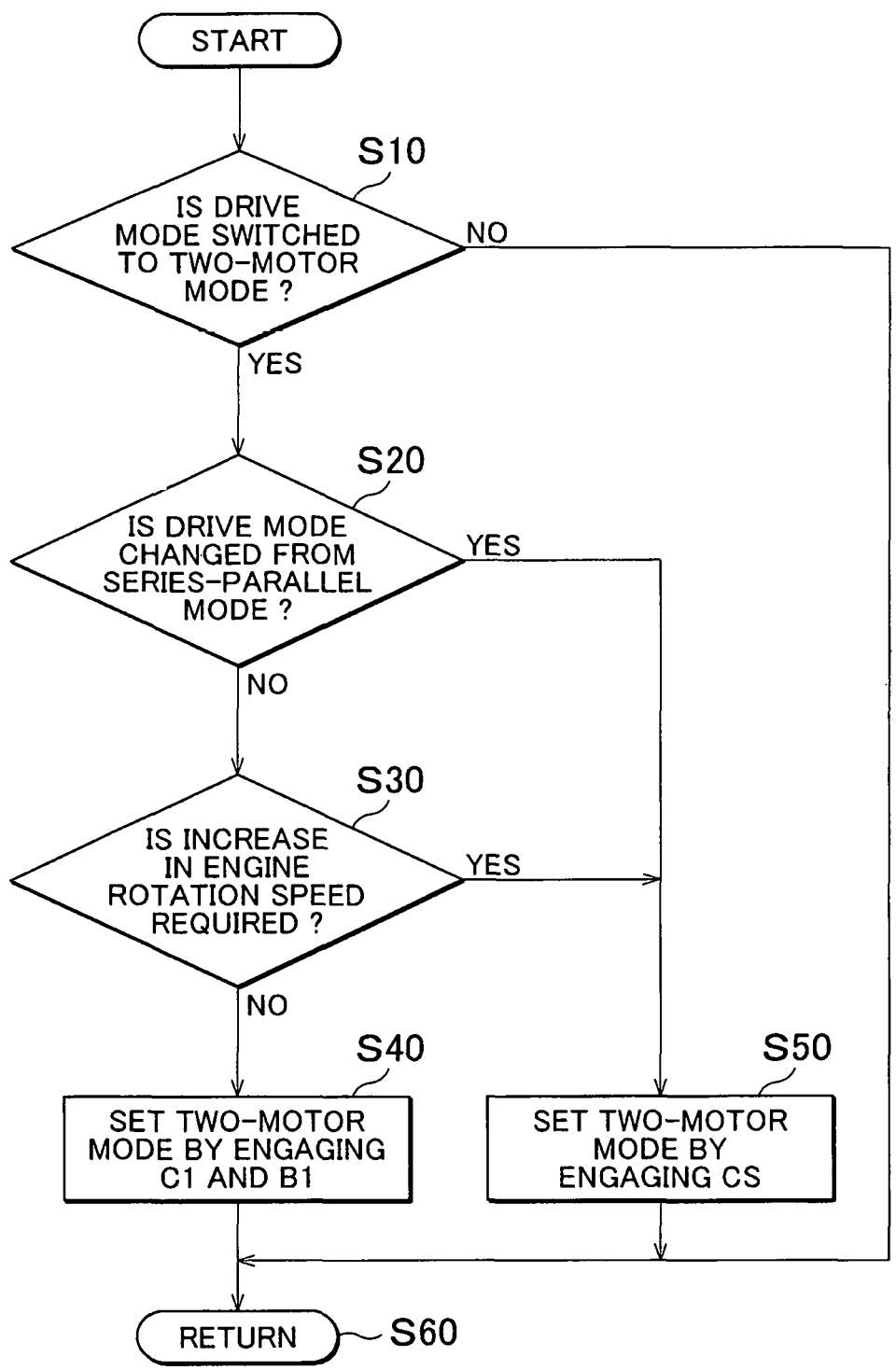
FIG. 15 is a flowchart for illustrating control over the clutches and the brake in two-motor EV mode in the hybrid vehicle.

FIG. 15 is a flowchart for illustrating control over the clutches and the brake in two-motor EV mode, which is executed by the controller 100. As shown in FIG. 15, when the process of this flowchart is started, it is initially determined in step S10 whether the drive mode is switched to the two-motor mode.

Figure 16:
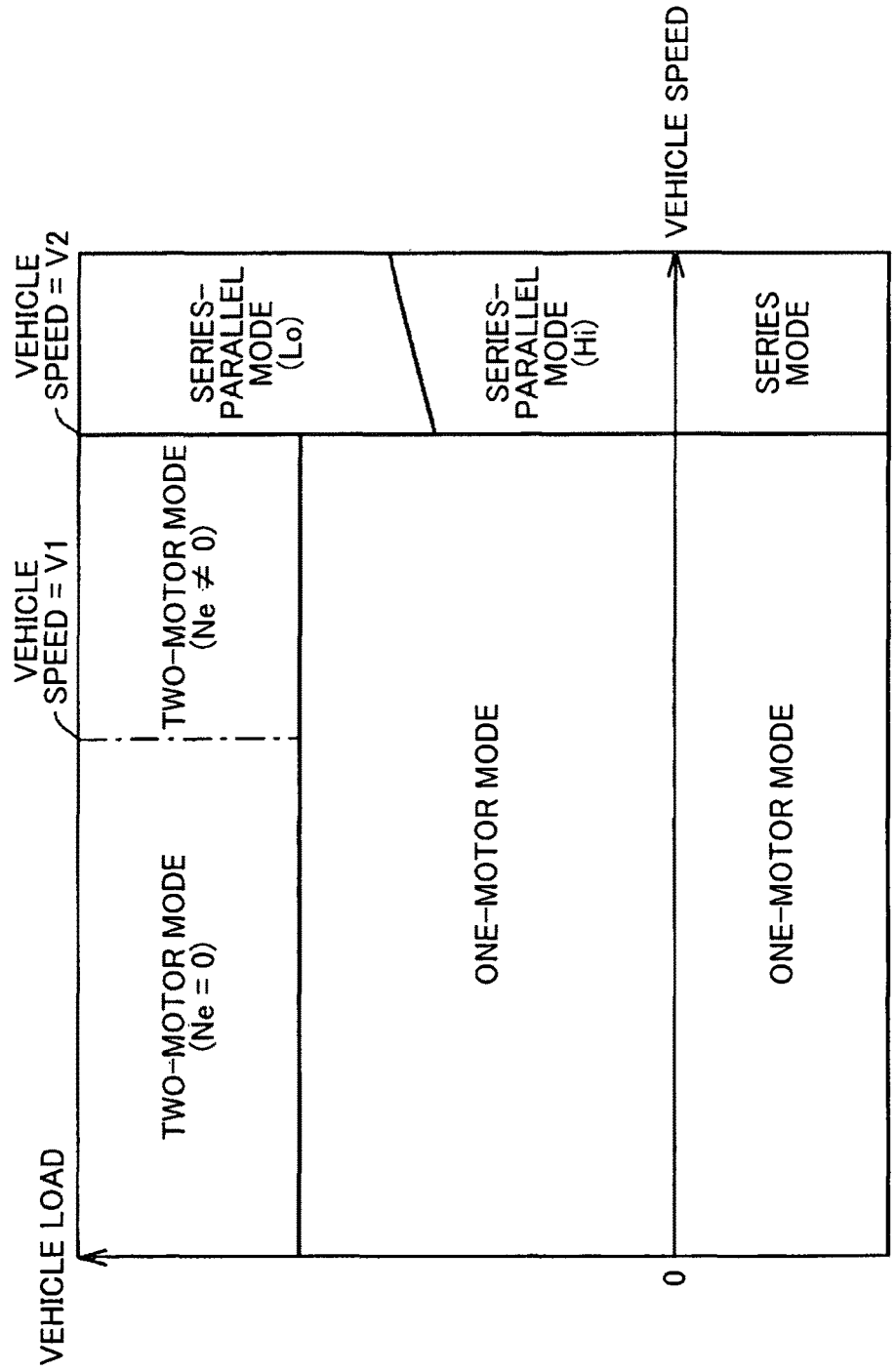
FIG. 16 is a view that shows an example of a map for determining the drive mode in the hybrid vehicle.

For example, determination as to switching of the drive mode is carried out on the basis of a map in which ranges are determined on the basis of a vehicle speed and a vehicle load; FIG. 16 is a view that shows an example of such a map for determining the drive mode. As shown in FIG. 16, in positive and negative low load ranges, the one-motor EV mode is used. Basically, it is not necessary to assume a startup of the engine 10, a relatively wide range in which reaction force compensation torque resulting from a startup of the engine 10 is not required may be allocated to the one-motor EV mode.

In a high load range, torque is insufficient in one-motor mode, so the two-motor mode is selected. That is, in a range in which the vehicle speed is lower than a predetermined value and the load is small, the one-motor EV mode is selected; whereas, when the load is larger than a predetermined value, the two-motor EV mode is selected.

When the vehicle speed exceeds the predetermined value V1 in two-motor mode, because the rotation speed of each of the first MG 20 and the pinion gears has an upper limit, the state of the vehicle changes from the two-motor mode (FIG. 7) in which the engine rotation speed Ne is zero to the two-motor mode (FIG. 10) in which the engine rotation speed Ne is not zero.

When the vehicle speed exceeds V2, because the energy efficiency at the time when the vehicle travels by using the electric power of the battery tends to deteriorate, any one of the series-parallel HV mode (Lo), the series-parallel HV mode (Hi) and the series HV mode is selected.

When the drive mode is not switched to the two-motor mode in step S10, the process proceeds to step S60, and the control is returned to the main routine. On the other hand, when the drive mode is switched to the two-motor mode in step S10, the process proceeds to step S20.

In step S20, it is determined whether the drive mode is changed from the series-parallel mode to the two-motor EV mode. For example, when the state is changed from the one-motor EV mode as shown in FIG. 6 to the two-motor EV mode, because the engine rotation speed is zero, it is relatively easy to directly change into the state shown in FIG. 7. However, in series-parallel mode as shown in FIG. 8, the engine rotation speed is not zero. Therefore, in order to change from the state shown in FIG. 8 to the state shown in FIG. 7, it is required to decrease the rotation speed of the engine, coasting by inertia force, to zero. Therefore, when the drive mode before a change is the series-parallel mode in step S20 (YES in S20), the process proceeds to step S50, the clutch CS is engaged, the state shown in FIG. 10 is once set, and the drive mode is placed in two-motor EV Mode in which the engine rotation speed Ne is not zero.

Even when the drive mode before a change is not the series-parallel mode in step S20 (YES in S20), but when it is required in step S30 to set the engine rotation speed Ne to a predetermined rotation speed or higher, the process proceeds to step S50 because of a similar reason. In step S50, the clutch CS is engaged, the state shown in FIG. 10 is once set, and the drive mode is placed in two-motor EV mode in which the engine rotation speed Ne is not zero. For example, when it is required to drive the MOP 501 for lubrication or when it is required to avoid a rotation speed range in which the vibration of the vehicle increases because of resonance, it is determined that it is required to set the engine rotation speed Ne to the predetermined rotation speed or higher.

When it is not required to increase the engine rotation speed Ne in step S30 (NO in S30), the process proceeds to step S40. In step S40, the drive mode is switched to the two-motor EV Mode by engaging the clutch C1 and the brake B1.

When the states of the clutches C1, CS and brake B1 are determined in step S40 or step S50, the process proceeds to step S60, and the control is returned to the main routine.

As described above, as shown in FIG. 14 to FIG. 16, the controller 100 sets the drive mode to a first mode (E3 line in FIG. 5: two-motor EV mode (Ne=0)) when the vehicle speed is lower than the determination threshold V1, and sets the drive mode to a second mode (E5 line in FIG. 5: two-motor EV mode (Ne free)) when the vehicle speed is higher than the determination threshold.

When the drive mode is selected as described above, even when the vehicle speed increases and the vehicle is not allowed to travel in first mode because of the limitation of the rotation speed of the first MG 20, the vehicle is allowed to travel with large driving force by using the first MG 20 and the second MG 30 at the same time when the second mode is used.

Preferably, the hybrid vehicle 1 further has a third mode (H7, H9 lines in FIG. 5: two-motor parallel HV mode) as the drive mode. In third mode, the controller 100 sets the transmission unit 40 to the non-neutral state and sets the clutch CS to the released state, and then causes the first MG 20 to generate electric power in a state where the engine 10 is operated, and causes the second MG 30 to generate driving force for propelling the vehicle. When the controller 100 changes the drive mode from the third mode to the first mode, the controller 100 changes the drive mode via the second mode.

In this way, when the drive mode is changed from the third mode to the first mode, it is possible not to cause a driver to experience a feeling of output torque loss by changing the drive mode via the second mode.

Figure 17:
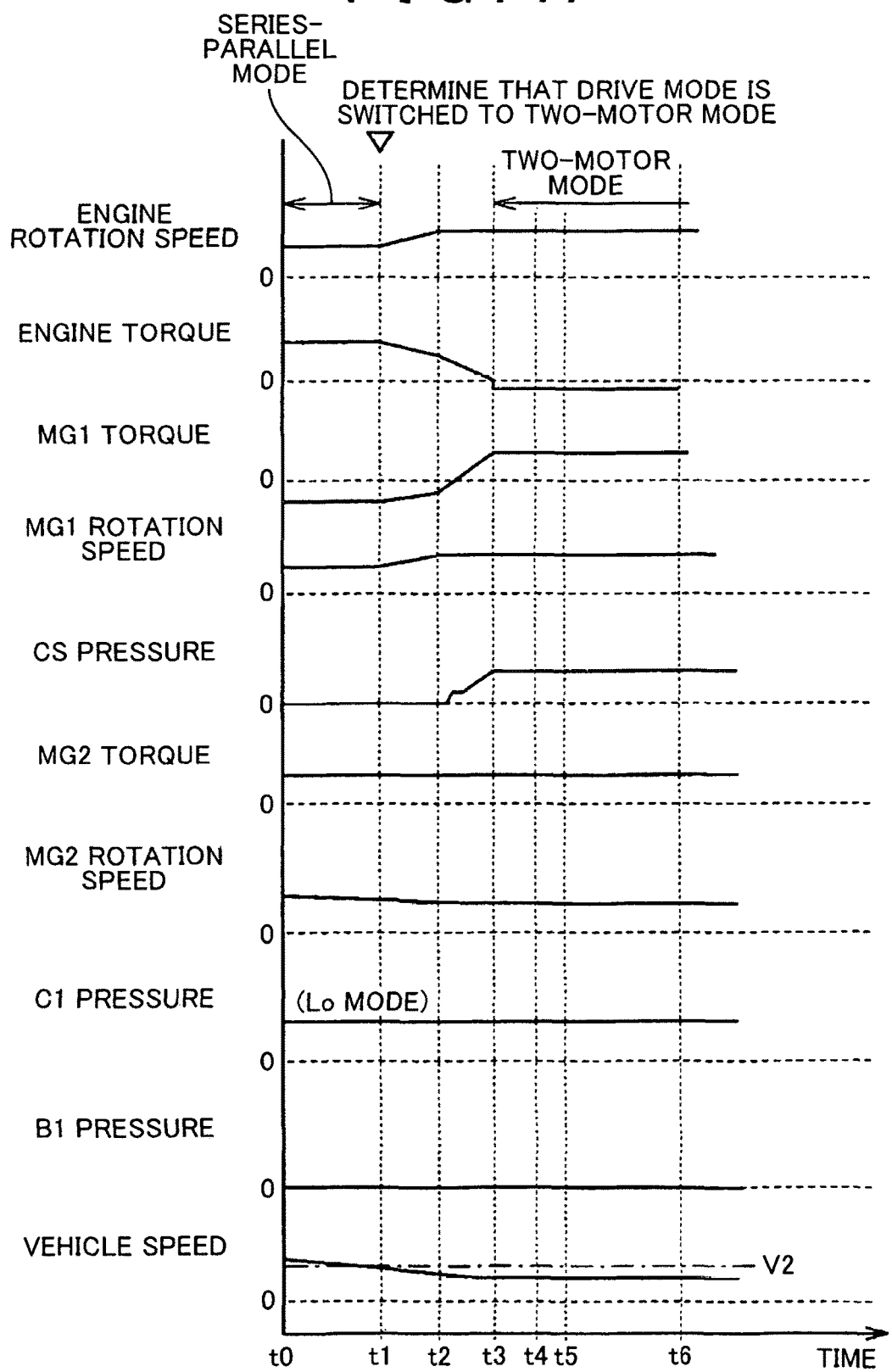
FIG. 17 is an operation waveform chart that shows an example of a change from the (series-parallel) HV mode to the two-motor EV mode in the hybrid vehicle.

Subsequently, an example at the time of a change of the drive mode will be described with reference to the operation waveform chart. FIG. 17 is an operation waveform chart that shows an example of a change from the series-parallel HV mode to the two-motor EV mode.

As shown in FIG. 17, in the initial state at time t0, the hybrid vehicle is traveling in series-parallel HV mode. At this time, the clutch C1 is controlled to the engaged state, the brake B1 is controlled to the released state, and the transmission unit 40 establishes the Lo gear position. The clutch CS is controlled to the released state.

From time t0 to time t1, the second MG 30 is outputting a positive torque at a positive rotation speed, and is being operated to carry out motoring. The first MG 20 is outputting a negative torque at a negative rotation speed, and is generating electric power through regenerative operation. The engine 10 is operating at a positive torque and a positive rotation speed.

At time t1, in response to the fact that the vehicle speed becomes lower than the threshold V2, it is determined to change the drive mode to the two-motor mode. At this time, the rotation speed of the first MG 20 is lower than the rotation speed of the engine 10 as shown by the nomograph indicated by the continuous lines in FIG. 8. When engagement of the clutch CS is started in a state where there is a difference in rotation speed, a shock at the time of engagement is large, so the process of synchronizing the rotation speed of the engine 10 with the rotation speed of the first MG 20 is executed from time t1 to time t2.

At time t2, when the rotation speed of the engine 10 and the rotation speed of the first MG 20 are substantially equal to each other, the CS pressure begins to increase from zero. From time t2 to time t3, the CS pressure increases, the engine torque reduces, and the torque (MG1 torque) of the first MG 20 changes from a negative value to a positive value.

At time t3, the clutch CS completes engagement, and the rotation speeds of the engine 10, first MG 20 and second MG 30 are equal to one another (the state indicated by the continuous lines in FIG. 10). After time t3, the vehicle travels in two-motor mode. At this time, the engine 10 is being rotated by the first MG 20 and the second MG 30, and negative torque is indicated as rotation resistance. After time t3, when fuel is not supplied to the engine 10 in the case where the vehicle is caused to travel in second mode (E5 line in FIG. 5: two-motor EV mode (Ne free)), the controller 100 changes the open/close timing of an intake valve or exhaust valve such that resistance during rotation of the engine 10 is reduced.

When the vehicle is caused to travel in second mode and fuel is not supplied to the engine 10, the engine 10 is forcibly rotated by the first MG 20 and the second MG 30. In this case, an energy loss is smaller when the rotation resistance of the engine 10 is small. In order to reduce the rotation resistance of the engine 10, it is desirable that the compressibility and expansion coefficient of air in a cylinder be small. Therefore, the controller 100 reduces the rotation resistance of the engine 10 by changing the open/close timing of the intake valve or exhaust valve, thus reducing an energy loss.

Lastly, the hybrid vehicle 1 according to the present embodiment is summarized with reference to FIG. 1, and the like, again. As shown in FIG. 1, the hybrid vehicle 1 includes the engine 10, the first MG 20, the second MG 30, the transmission unit 40, the differential unit 50, the clutch CS and the controller 100. The controller 100 controls the engine 10, the first MG 20, the transmission unit 40 and the clutch CS. The controller 100 sets the transmission unit 40 to the non-neutral state and sets the clutch CS to the engaged state, and then causes the vehicle to travel by using driving force from the first MG 20 and driving force from the second MG 30 at the same time (FIG. 10).

By providing such a drive mode, the vehicle is allowed to be propelled by operating both the first MG 20 and the second MG 30 to carry out motoring even in a state where the rotation speed of the engine 10 is not zero (indicated as Ne free in E4, E5 lines in FIG. 5). Therefore, it is possible to increase the opportunity that the two rotary electric machines are allowed to be used, so the flexibility of control over the vehicle increases in the case where large driving force is required in EV mode.

Preferably, the controller 100 switches the drive mode of the vehicle between the first mode (E3 line in FIG. 5) and the second mode (E4, E5 lines in FIG. 5) in response to the vehicle speed. The first mode is a drive mode in which the rotation speed of the engine 10 is fixed to zero and the clutch CS is set to the released state, and then the vehicle is caused to travel by using driving force from the first MG 20 and driving force from the second MG 30 at the same time. The second mode is a drive mode in which the transmission unit 40 is set to the non-neutral state and the clutch CS is set to the engaged state, and then the vehicle is caused to travel by using driving force from the first MG 20 and driving force from the second MG 30 at the same time.

Because the second mode is provided as the drive mode as described above, even when the rotation speed of the engine is not zero like a change from a state where the engine is being operated to the EV mode, the vehicle is able to travel with large driving force using the first MG 20 and the second MG 30 at the same time.

The embodiment described above is illustrative and not restrictive in all respects. The scope of the invention is defined by the appended claims rather than the above description. The scope of the invention is intended to encompass all modifications within the scope of the appended claims and equivalents thereof.

What is claimed is:

1. A hybrid vehicle comprising:
   an internal combustion engine;
   a first rotary electric machine;
   a second rotary electric machine configured to output power to a drive wheel;
   a power transmission unit including an input element and an output element, the input element being configured to receive power from the internal combustion engine, the output element being configured to output power input to the input element, and the power transmission unit being configured to switch between a non-neutral state where power is transmitted between the input element and the output element and a neutral state where power is not transmitted between the input element and the output element;
   a differential unit including a first rotating element, a second rotating element and a third rotating element, the first rotating element being connected to the first rotary electric machine, the second rotating element being connected to the second rotary electric machine and the drive wheel, the third rotating element being connected to the output element, and the differential unit being configured such that, when rotation speeds of any two of the first rotating element, the second rotating element and the third rotating element are determined, a rotation speed of a remaining one of the first rotating element, the second rotating element and the third rotating element is determined;
   a clutch configured to switch between an engaged state where power is transmitted from the internal combustion engine to the first rotary electric machine and a released state where transmission of power from the internal combustion engine to the first rotary electric machine is interrupted, power from the internal combustion engine being transmitted to the first rotary electric machine though at least one of a first path or a second path, the first path being a path through which power is transmitted from the internal combustion engine to the first rotary electric machine via the power transmission unit and the differential unit, and the second path being a path through which power is transmitted from the internal combustion engine to the first rotary electric machine, the second path being different from the first path and not including the differential unit, and the clutch being provided in the second path; and a controller configured to:
  (i) control the internal combustion engine, the first rotary electric machine, the power transmission unit and the clutch, and
  (ii) set the power transmission unit to the non-neutral state, set the clutch to the engaged state, and then cause the vehicle to travel by using driving force from the first rotary electric machine and driving force from the second rotary electric machine.

2. The hybrid vehicle according to claim 1, wherein
the controller is configured to switch a drive mode of the vehicle between a first mode and a second mode in response to a vehicle speed,
the first mode is a drive mode in which a rotation speed of the internal combustion engine is fixed to zero, the clutch is set to the released state and then the vehicle is caused to travel by using driving force from the first rotary electric machine and driving force from the second rotary electric machine, and
the second mode is a drive mode in which the power transmission unit is set to the non-neutral state, the clutch is set to the engaged state and then the vehicle is caused to travel by using driving force from the first rotary electric machine and driving force from the second rotary electric machine.

3. The hybrid vehicle according to claim 2, wherein
the controller is configured to:
  (i) when the vehicle speed is lower than a determination threshold, set the drive mode to the first mode, and
  (ii) when the vehicle speed is higher than the determination threshold, set the drive mode to the second mode.

4. The hybrid vehicle according to claim 2, wherein
the controller is configured to:
  (i) in a third mode that is the drive mode of the vehicle, set the power transmission unit to the non-neutral state, set the clutch to the released state, and then cause the first rotary electric machine to generate electric power in a state where the internal combustion engine is operated, and cause the second rotary electric machine to generate driving force for propelling the vehicle, and
  (ii) when the drive mode is changed from the third mode to the first mode, change the drive mode via the second mode.

5. The hybrid vehicle according to claim 2, wherein
the controller is configured to, when fuel is not supplied to the internal combustion engine in the case where the vehicle is caused to travel in the second mode, change open or close timing of at least one of an intake valve or an exhaust valve such that resistance during rotation of the internal combustion engine is reduced.

6. The hybrid vehicle according to claim 1, wherein
the controller is configured to set the power transmission unit to the non-neutral state, set the clutch to the engaged state, and then cause the vehicle to travel by using driving force from the internal combustion engine in addition to driving force from the first rotary electric machine and driving force from the second rotary electric machine.

7. The hybrid vehicle according to claim 1, wherein
the controller is configured to, in a fourth mode as the drive mode of the vehicle, set the power transmission unit to the non-neutral state, set the clutch to the engaged state, and then cause the vehicle to travel by using driving force from the internal combustion engine in a state where the first rotary electric machine and the second rotary electric machine are not caused to generate torque.

8. The hybrid vehicle according to claim 1, wherein
the controller is configured to, in a fifth mode as the drive mode of the vehicle, set the power transmission unit to the neutral state, set the clutch to the engaged state, and then cause the first rotary electric machine to generate electric power by using power of the internal combustion engine, and cause the second rotary electric machine to generate driving force for propelling the vehicle.

9. The hybrid vehicle according to claim 1, wherein
the power transmission unit is configured to change a ratio of a rotation speed of the input element to a rotation speed of the output element.

* * * * *